United States Patent
Anbarasu et al.

(10) Patent No.: US 9,660,493 B2
(45) Date of Patent: May 23, 2017

(54) DIRECT DRIVE SEGMENTED GENERATOR

(75) Inventors: Ramasamy Anbarasu, Garching (DE); Mohamed Osama, Garching (DE); Raphael Neumann, Ludwigsburg (DE)

(73) Assignee: VESTAS WIND SYSTEM A/S, Aarhus N (DK)

( * ) Notice: Subject to any disclaimer, the term of this patent is extended or adjusted under 35 U.S.C. 154(b) by 886 days.

(21) Appl. No.: 13/883,729

(22) PCT Filed: Nov. 6, 2011

(86) PCT No.: PCT/DK2011/050418
§ 371 (c)(1),
(2), (4) Date: Dec. 20, 2013

(87) PCT Pub. No.: WO2012/059110
PCT Pub. Date: May 10, 2012

(65) Prior Publication Data
US 2014/0091673 A1 Apr. 3, 2014

Related U.S. Application Data

(60) Provisional application No. 61/410,590, filed on Nov. 5, 2010.

(30) Foreign Application Priority Data

Dec. 14, 2010 (DK) .................................. 2010 70543
Dec. 14, 2010 (DK) .................................. 2010 70544
Dec. 14, 2010 (DK) .................................. 2010 70545

(51) Int. Cl.
*H02K 3/12* (2006.01)
*H02K 3/28* (2006.01)
(Continued)

(52) U.S. Cl.
CPC ................. *H02K 3/12* (2013.01); *H02K 3/28* (2013.01); *H02K 3/48* (2013.01); *H02K 15/064* (2013.01);
(Continued)

(58) Field of Classification Search
CPC .. H02K 3/12; H02K 3/28; H02K 3/48; H02K 15/024; H02K 15/0464; H02K 15/08; H02K 15/085
See application file for complete search history.

(56) References Cited

U.S. PATENT DOCUMENTS 4,115,915 A * 9/1978 Godfrey ................... H02K 3/12
29/596
5,196,752 A * 3/1993 Palma .................... H02K 3/524
310/184

(Continued)

FOREIGN PATENT DOCUMENTS

DE 102007054719 A1 1/2009
EP 1093207 A2 4/2001
(Continued)

OTHER PUBLICATIONS

International Search Report and Written Opinion; Jul. 10, 2012; PCT/DK2011/050418.
(Continued)

*Primary Examiner* — Dang Le
(74) *Attorney, Agent, or Firm* — Patterson + Sheridan, LLP

(57) ABSTRACT

The present invention relates a stator segment for an electrical machine, comprising a plurality of windings, each winding having a winding starting and ending point, and a stator yoke with a plurality of stator slots for receiving at least one stator winding, said segment having a first side and a second side. At least one winding having its starting point
(Continued)

at the first side, and its ending point at the first side of the segment, the at least one winding is received in one or more stator slots. At least one other winding having its starting point at the second side, and its ending point at the second side of the segment, the at least one other winding is received in one or more stator slots.

13 Claims, 20 Drawing Sheets

(51) Int. Cl.
  *H02K 15/06* (2006.01)
  *H02K 3/48* (2006.01)
  *H02K 15/08* (2006.01)
  *H02K 1/14* (2006.01)
  *H02K 7/18* (2006.01)

(52) U.S. Cl.
  CPC ............ *H02K 15/08* (2013.01); *H02K 1/148* (2013.01); *H02K 7/1838* (2013.01); *Y02E 10/725* (2013.01); *Y10T 29/49009* (2015.01)

(56) References Cited

U.S. PATENT DOCUMENTS

| 5,592,731 | A | 1/1997 | Huang et al. |
| 6,011,339 | A * | 1/2000 | Kawakami ............ H02K 1/278 310/208 |
| 6,870,292 | B2 * | 3/2005 | Owada ................... H02K 3/24 310/194 |
| 2008/0246362 | A1 | 10/2008 | Hirzel |

FOREIGN PATENT DOCUMENTS

| EP | 2211443 A1 | 7/2010 |
| GB | 2442622 A | 4/2008 |
| GB | 2442622 B | 6/2009 |
| WO | 0060719 A1 | 10/2000 |
| WO | 2005096469 A2 | 10/2005 |
| WO | 2006008331 A1 | 1/2006 |
| WO | 2008014584 A1 | 2/2008 |

OTHER PUBLICATIONS

Search Report and Opinion (Danish Patent & Trademark Office); Aug. 1, 2011; PA 2010 70544.

* cited by examiner

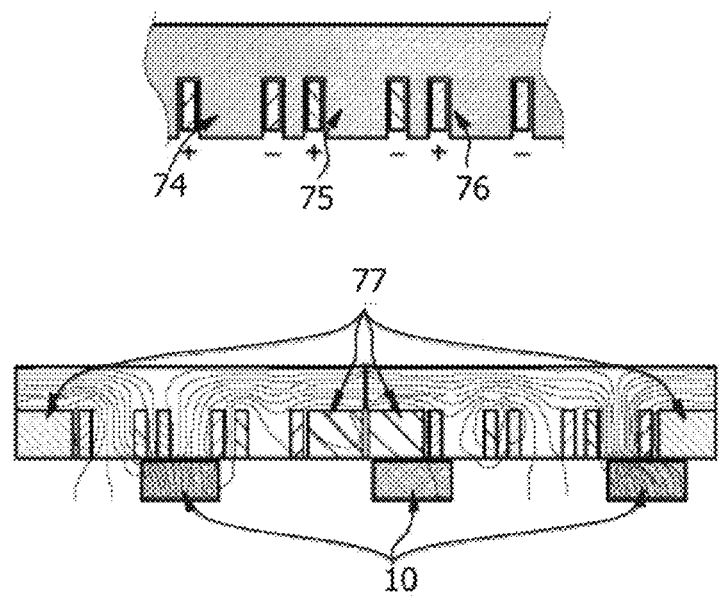
Fig. 24
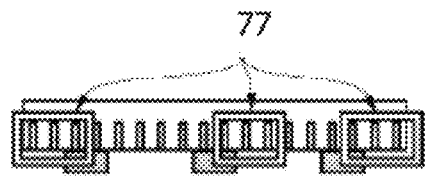
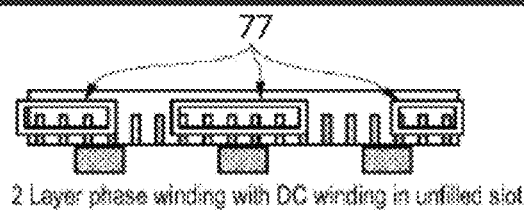
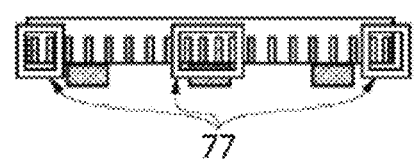
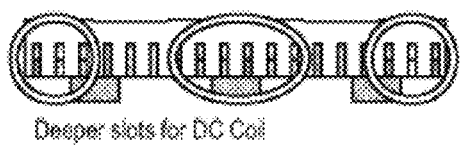
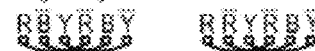
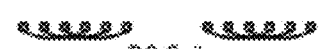
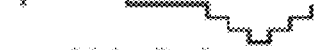
Fig. 25

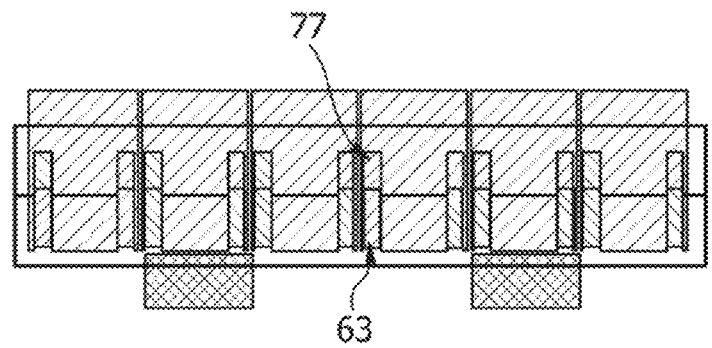
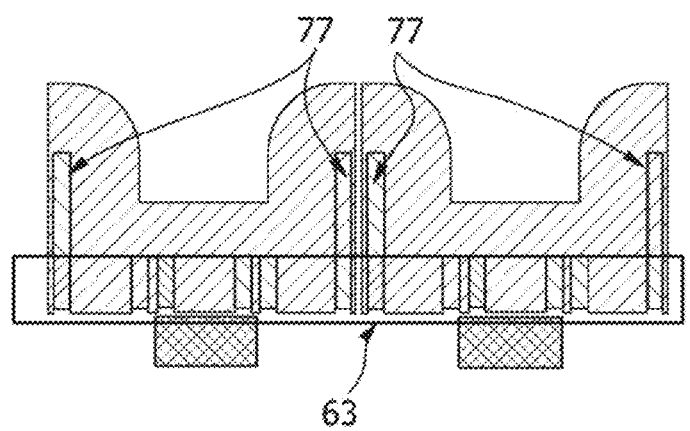
Fig. 26
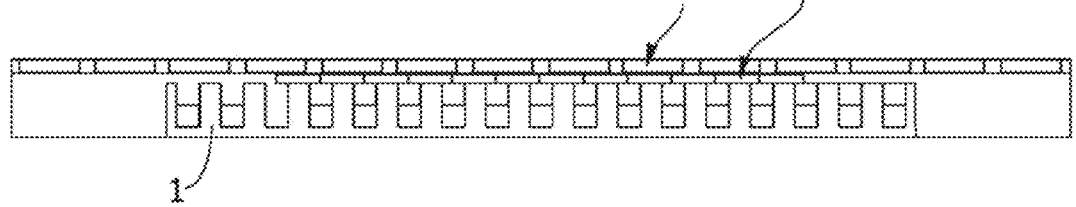
Fig. 27
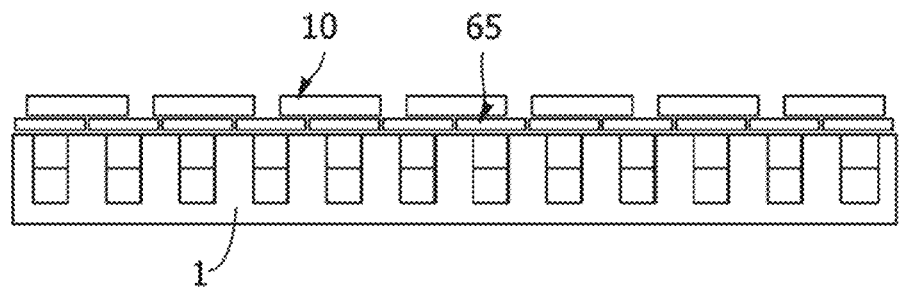
Fig. 28

- Module total length 17.5 segments, current directions reversed in second module
- Module total length 17.0 segments, same current directions in both modules
- Module total length 18.0 segments, same current directions in both modules

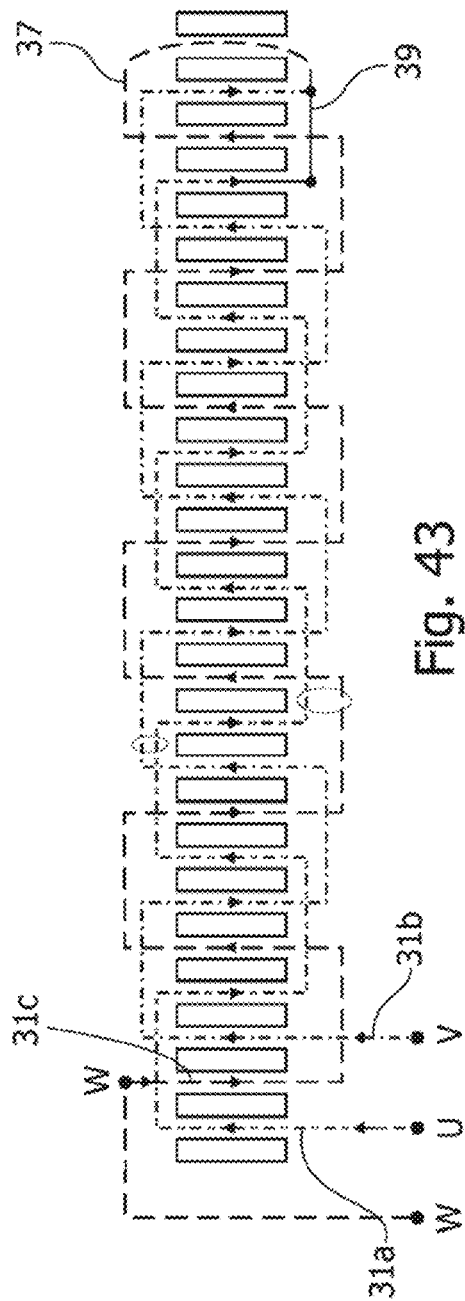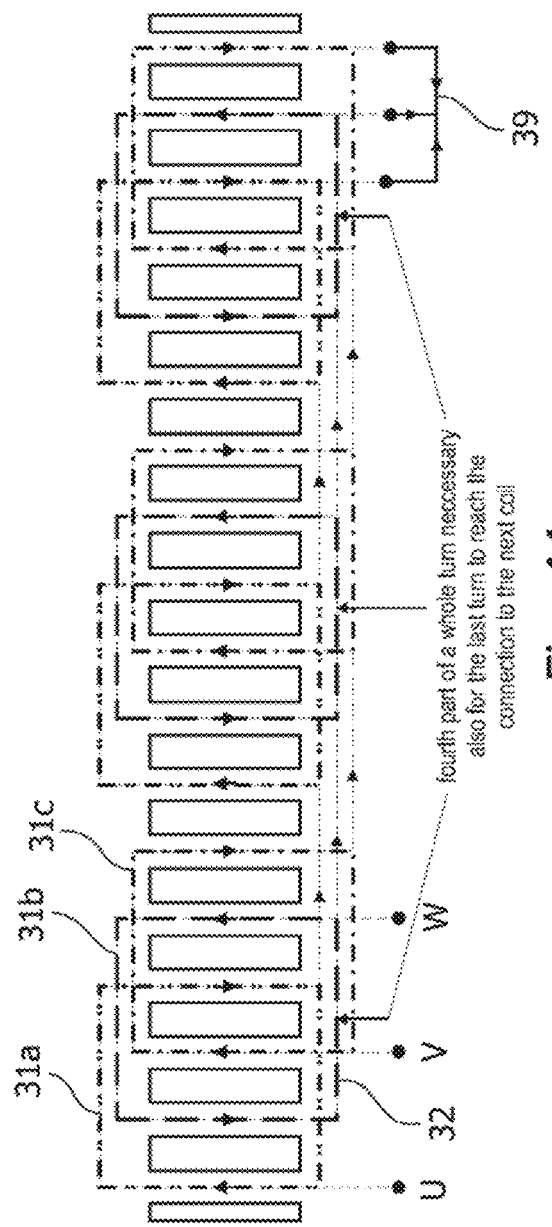

DIRECT DRIVE SEGMENTED GENERATOR

FIELD OF THE INVENTION

The present invention relates to a direct drive generator and to a segment of a direct drive generator.

BACKGROUND OF THE INVENTION

Generators according to prior art systems typically involve one of the following types of generators:
1. Conventional Wound field Synchronous Generators
2. Induction Generators
3. Permanent Magnet Generators The main criteria used for selecting a generator to a specific application typically involve decisions about:
Torque Density
2. Power factor
3. Efficiency
4. Weight
5. Cost The above-mentioned types of generators are typically connected to a set of rotor blades through a drive-train involving a gear-box.

It may be seen as an object of embodiments of the present invention to provide a simple and robust direct drive arrangement and avoiding the traditional problems, such as backlashing problems, in wind turbine gear-boxes.

DESCRIPTION OF THE INVENTION

This section is provided to introduce a selection of concepts in a simplified form that are further described below in the detailed description. This segment is not intended to identify key features or essential features of the claimed subject matter, nor is it intended to be used as an aid in determining the scope of the claimed subject matter.

The stator of an electrical machine normally consists of a set of electrical windings in which magnetic flux induces an electrical voltage. The windings are in most machines inserted in slots in an iron core, also known as the stator yoke. In a traditional high speed machine, such as a 4 or 6 pole electrical machine, fed with a 50 or 60 Hz supply, the stator yoke is made of a stack of lamination sheets stacked in the axial direction, each single piece of lamination circumference the whole rotor. Low speed machines with high number of poles and a large diameter of several meters. For the low speed machine it is practically impossible to make single piece of lamination, thus the stator is segmented into a plurality of stator segments.

The plurality of stator segments may form only a fraction of a stator polygon structure. Thus, the stator segments may be arranged to cover for example 30, 60, 90, 120 degrees (or any other angle) along the circumferential direction of the stator. The stator segments may be arranged in a group or in groups, such groups of stator segments optionally being oppositely arranged along the circumferential direction of the stator.

Alternatively, the plurality of stator segments may form a full/complete 360 degrees stator polygon structure.

The stator segments may, in a radial plane of the power generator, have an essentially rectangular cross-sectional profile.

Each stator segment is preferably made of a lamination stack of thin sheet metal. Each sheet forms a two dimensional picture of a stator segment, the third dimension is formed by the stacking of the lamination sheets. The sheets are formed so that there are slots for receiving a number of stator winding, one can also say that the slots form a number of stator teeth. The stator segment then has a first side formed by the first piece of lamination sheet, and a second side formed by last piece of lamination sheet. The other four sides comprise the main sides of the lamination sheet and are thus: a front side (facing the air gap), a rear side opposite of the air gap, that should face the rotor of the machine, see FIG. 3 and the remaining two sides that will be adjacent to the adjacent segment.

Each stator segment may comprise a dovetail shaped attaching arrangement for securing each stator segment to a frame structure. The dovetail shape may be positioned on the rear side of the segment. A non-magnetic material may be positioned between the dovetail shaped attaching arrangements and the frame structure in order to reduce leakage flux between stator segments and the frame structure. The non-magnetic material may comprise a stainless steel cover positioned between the dovetail shaped attaching arrangements and the frame structure.

V-shaped gaps may exist between neighbouring stator segments when these are aligned in the polygon structure. A ferromagnetic material may be position in the V-shaped gaps 6 between neighbouring stator segments thereby enhancing the efficiency of the power generator. Moreover, suitable stator cooling means may be positioned within the V-shaped gaps.

Each stator segment may comprise steel laminates, said steel laminates being arranged in a tangential direction to the circumferential direction of the stator.

In a first aspect, the present invention relates to a stator segment for an electrical machine, comprising a plurality of windings, each winding having a winding starting and ending point, and a stator yoke with a plurality of stator slots for receiving at least one stator winding, said segment having a first side and a second side. At least one winding having its starting point at the first side, and its ending point at the first side of the segment, the at least one winding is received in one or more stator slots, and at least one other winding having its starting point at the second side, and its ending point at the second side of the segment, the at least one other winding is received in one or more stator slots.

An advantage of first aspect is that the total length of the windings can be reduced, and that it allows for more options, when inserting the winding in the slots of the segment, for not having to deal with end winding locations where all the phases of the machine have to cross each other.

According to one embodiment of the invention a stator segment wherein the plurality of ending points of the winding connecting at a common point, and where the at least one winding ending at the second side is/are extended to connect with the other ending points.

An advantage of this embodiment is that the total length of end winding is reduced, and that it allows for more options, when inserting the winding, for not having to deal with end winding locations where all the phases of the machine have to cross each other. Extending one of the windings allows for a connection of the phases to a common point, for making a star point.

According to one embodiment of the invention a stator segment for an electrical machine wherein the at least one winding ending at the second side is/are extended along a rear side of the segment.

An advantage of this embodiment is that the total length of end winding is reduced, extending one of the windings allows for a connection of the phases to a common point, for making a star point and by extending it along a rear side of the segment, often, but limited to an extension behind the yoke may result in a shorter winding especially whenever the length of the stator yoke is short.

According to one embodiment of the invention the stator segment for an electrical machine according comprises three windings.

An advantage of this embodiment is that two windings can have their starting and ending point at the first side of the segment and one winding can have its starting and ending point at the second side of the segment. This makes an easy and simple connection of the windings. For a very large machine it may even give more room for a termination busbar, where the winding ends of the phases connect to a corresponding phase busbar (not shown).

According to one embodiment of the invention the stator segment comprises the windings embedded in the slots in a single layer.

An advantage of this embodiment is that there will be no stator slots only half filled.

According to one embodiment of the invention the stator segment comprises the windings embedded in the slots in a double layer.

An advantage of this embodiment is that there will be more options for making a higher number of winding turns combined with lap windings.

In a second aspect of the invention an electrical machine comprising a plurality of stator segments according to the previous mentioned embodiment.

Thus the advantages of this aspect are similar to the previous mentioned embodiments, although the aspect relates to a whole machine consisting of a plurality of segments.

According to one embodiment of the invention an electrical machine comprising a plurality of stator segments, having a plurality of groups of segments, the groups of segments each comprises a set of serial segments and an end segment, wherein for the set of serial segments, each of the plurality of windings is connected in series with its corresponding winding in the adjacent segment and wherein the corresponding windings of the end segment is connected in series with the winding of the set of serial segments, wherein the plurality of ending points connecting at a common point, and where the at least one winding ending at the second side is/are extended to connect with the other ending points.

An advantage of this embodiment is that a plurality of segments can connected in series, where the end windings of the last segment is connected to a common point, known as a star point. By connecting several segments in series the voltage of the generator is increased and the voltage among the phases is more balanced.

A third aspect, the present invention relates to a method of assembling a stator segment for an electrical machine comprising a plurality of windings, each winding having a winding starting and ending point, and a stator yoke with a plurality of stator slots for receiving at least one stator winding, said segment having a first side and a second side, said method comprising the steps of:

Embedding at least one winding with its starting point at the first side, and its ending point at the first side of the segment, in one or more stator slots, and Embedding at least one other winding having its starting point at the second side, and its ending point at the second side of the segment, in one or more stator slots.

The advantages of the third aspect are equivalent to the advantages for the first aspect of the present invention.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

BRIEF DESCRIPTION OF THE DRAWINGS

The present invention will be explained in further details with reference to the accompanying figures, wherein FIG. 24 shows a fault tolerant phase winding, FIG. 25 shows slots of the same size for phase winding and DC excited field winding, FIG. 26 shows a modified E-core arrangement with deep field coils, FIG. 27 shows a half model of a stator, a rotor and permanent magnet arrangement (4 pole model), FIG. 28 shows a hybrid synchronous machine with gaps in magnets.

FIG. 39 bottom shows a segment and part of adjacent segments of a machine with a double layer windings configuration, with lap windings.

FIG. 43 shows the winding path of a segment of a machine with optimal winding configuration, with low end winding waste.

FIG. 44 shows the winding path with turns of a segment of a machine, with large end winding waste.

DETAILED DESCRIPTION OF THE INVENTION

Polygon Shaped Machine

In its most general aspect the present invention relates to a new configuration of a stator for an axial flux machine. This novel machine configuration can be produced cheaper compared to traditional machine configurations.

Figure 1:
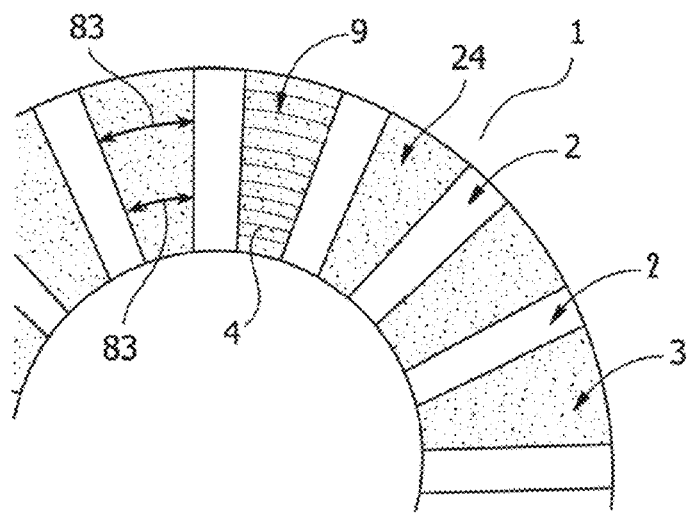
FIG. 1 shows an embodiment with tapered stator segments.

Referring now to FIG. 1, in axial flux machines the lamination direction 9 has to be in the tangential direction. Hence the lamination has to have a curvature. Because the circumference of the whole machine increases with increasing radius each lamination layer has to be a little larger. Thus, the positions of all the slots 2 at each single lamination layer need to be adjusted dependent on the lamination layer number. Fabricating axial flux machine stator with slots 2 is therefore a cumbersome process due to direction 9 of the lamination.

Figure 2:
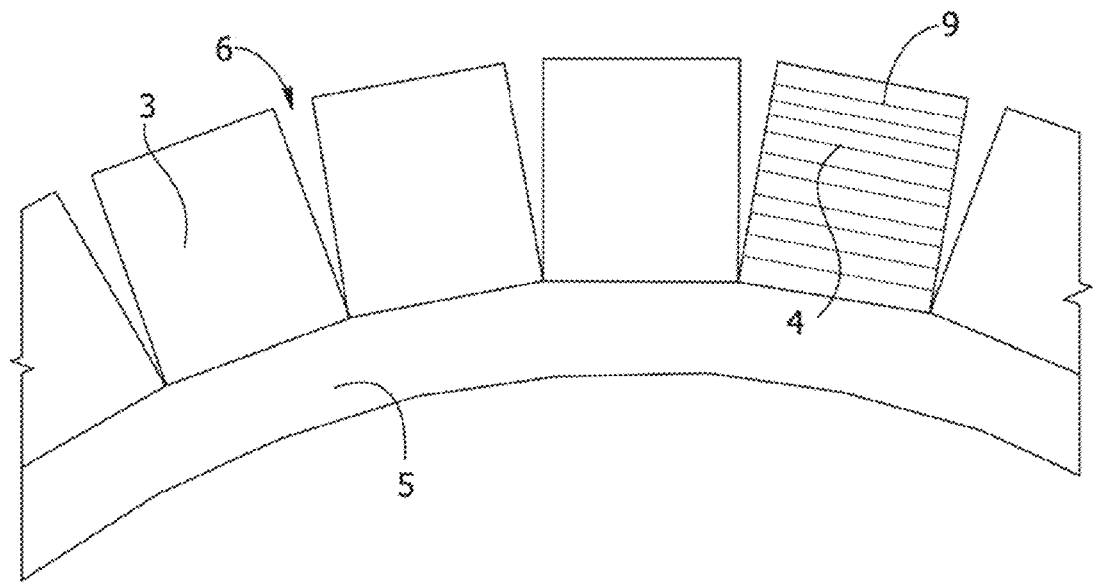
FIG. 2 shows an embodiment with rectangular stator segments.
Figure 3:
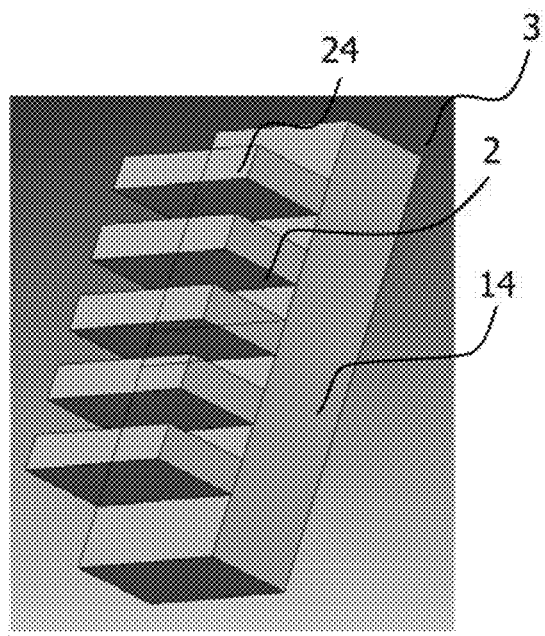
FIG. 3 shows rectangular-shaped stator segments.

The present invention relates to a stator arrangement where a rectangular block is made using thin steel laminates 4 similar to transformer E cores or linear machine lamination processes. A typical stator yoke block is shown in FIG. 3. The direction 9 of lamination 4 is depicted in FIG. 2.

If a very large mean diameter (>3 m) for the axial flux machine comprises a high number of slots 2 (>72), and if the iron length in comparison to the mean diameter is small (<0.5 m) the fabrication can be simplified a lot without significant disadvantages.

The stator 1 has to be divided into many segments 3. Each segment 3 contains a low number of slots 2 (e.g. 6 slots). Each segment 3 has the same shape and it can be fabricated by stacking together just one shape of lamination. The tooth 24 length 83 is constant. All these segments 3 have to be put on a polygon structure 5. Finally, a stator 1 can be assembled that looks fairly similar to the conventional. The only difference is small V-Gaps 6 (Gap distance<2 mm).

The big advantage is that the amount of different parts is very low compared to conventional stator designs.

The new stator design applies to axial flux machines with large diameters and relatively low iron length.

Figure 4:
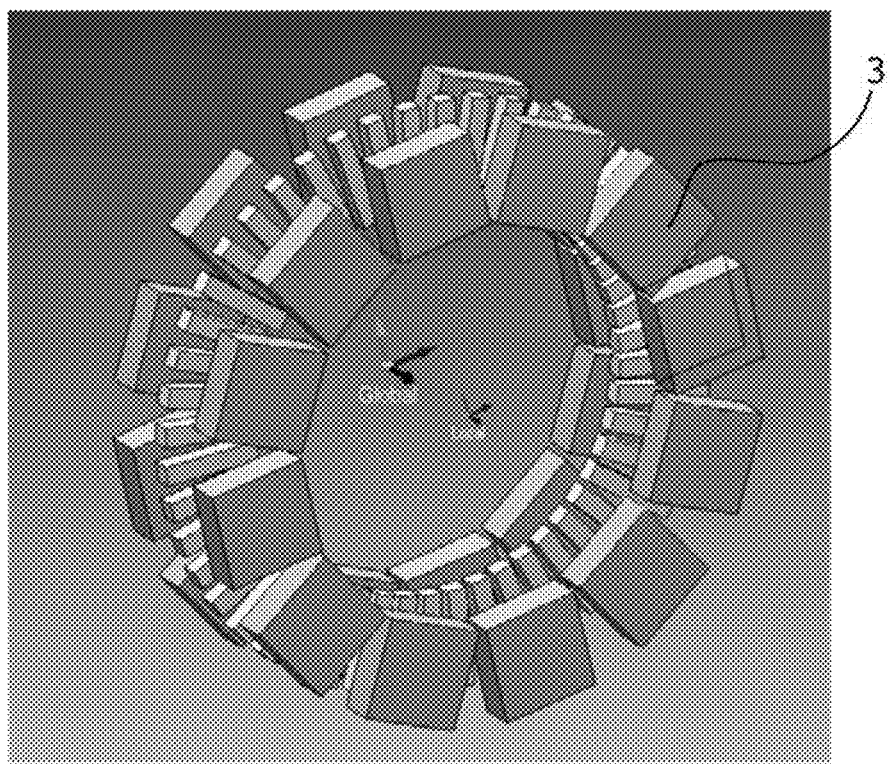
FIG. 4 shows V-shaped gaps 6 between stator segments.
Figure 5:
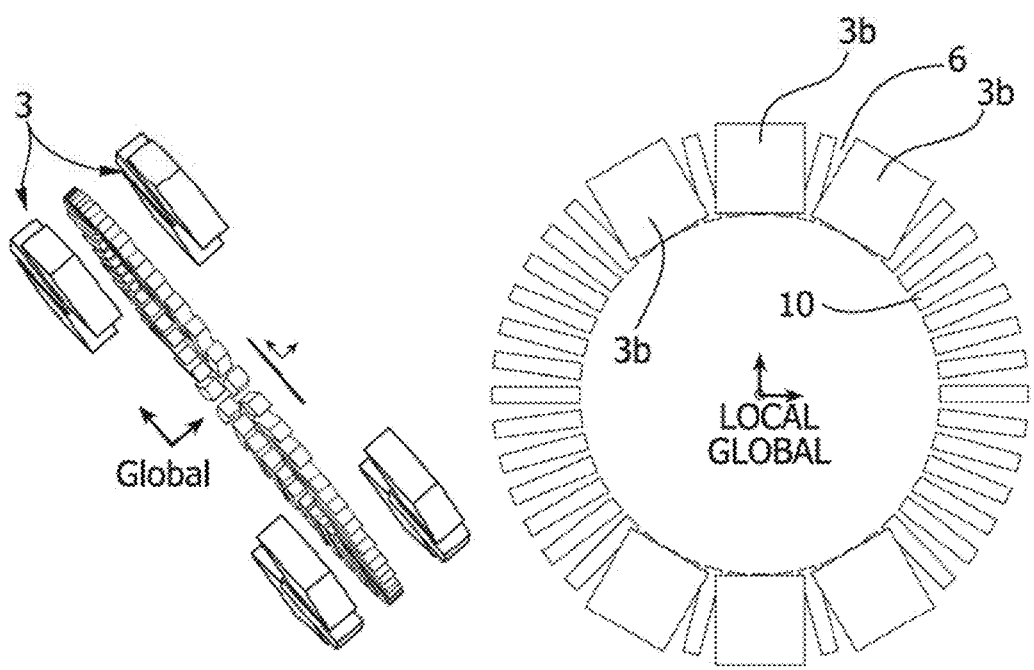
FIG. 5 shows a partial stator arrangement.

FIG. 4 and FIG. 5 show arrangements of axial flux topology with rectangular blocks, including adjacent stator segments 3b, adjacent to rotor blocks 10. This arrangement results in a plurality of V gaps 6 between adjacent segment 3b and results in loss of power production.

Figure 6:
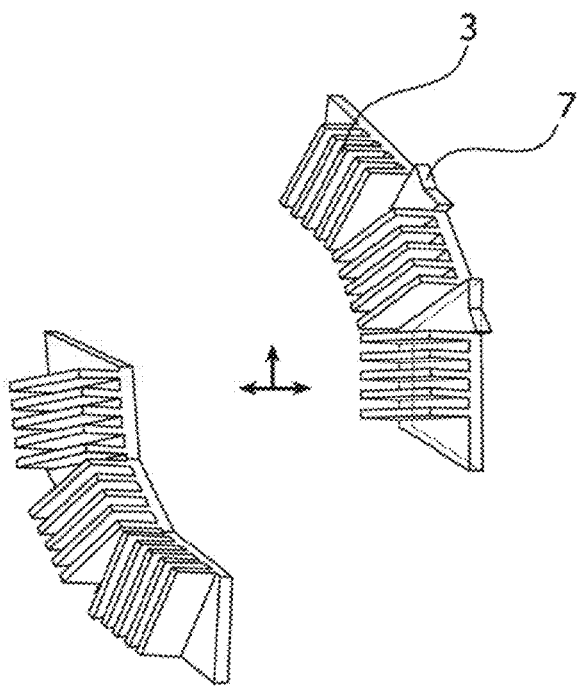
FIG. 6 shows a partial stator arrangement without V-shaped gaps.

It has been found that the filling up V gap 6 with ferromagnetic material 7 helps increasing the produced power by 20%. Having small constant air gap (inner to outer radius) say 1 to 2 mm between segments 3 does not decrease significantly power out of the machine. A typical arrangement without V gap 6 is shown in FIG. 6.

Figure 7:
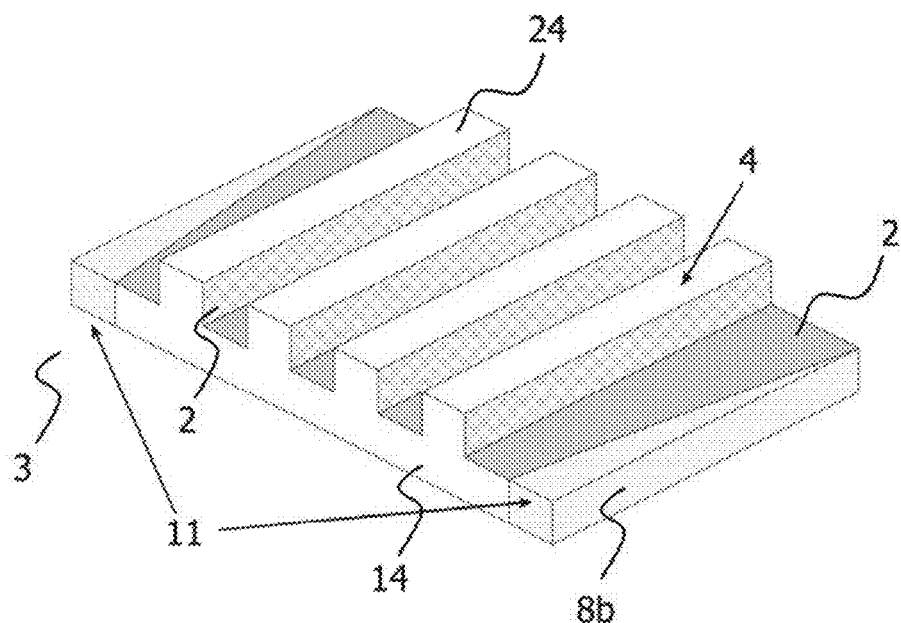
FIG. 7 shows a tapered stator segment.

FIG. 7 shows lamination stack that helps keeping equal air gap between the segments 3. Here are the ends of each segment 3 tapered 8b by removing triangle portions 11 of the lamination stack 4. This tooling process needs to ensure that it will not cause too many short circuits for eddy currents.

Figure 8:
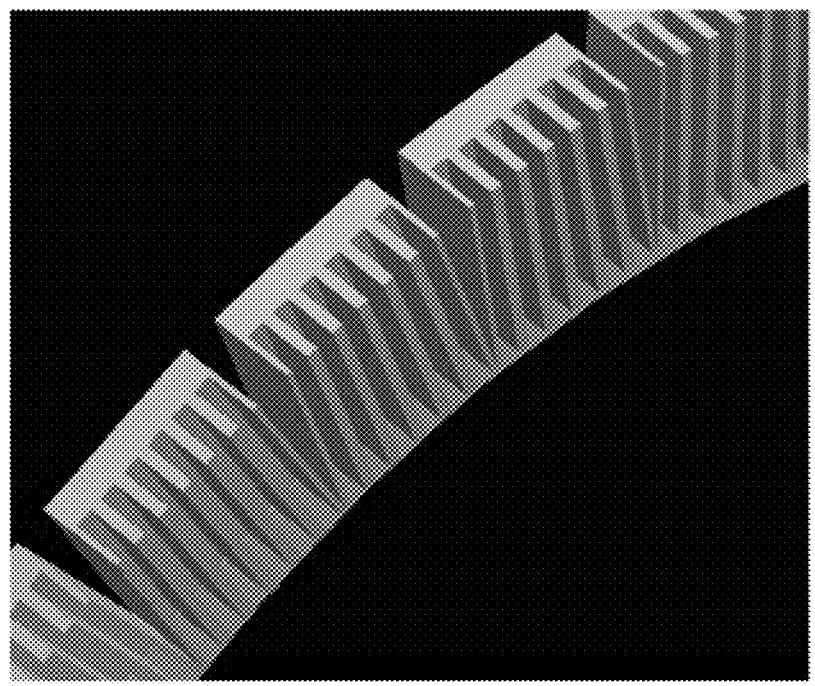
FIG. 8 shows adjacently arranged stator segments with open V-gaps.
Figure 9:
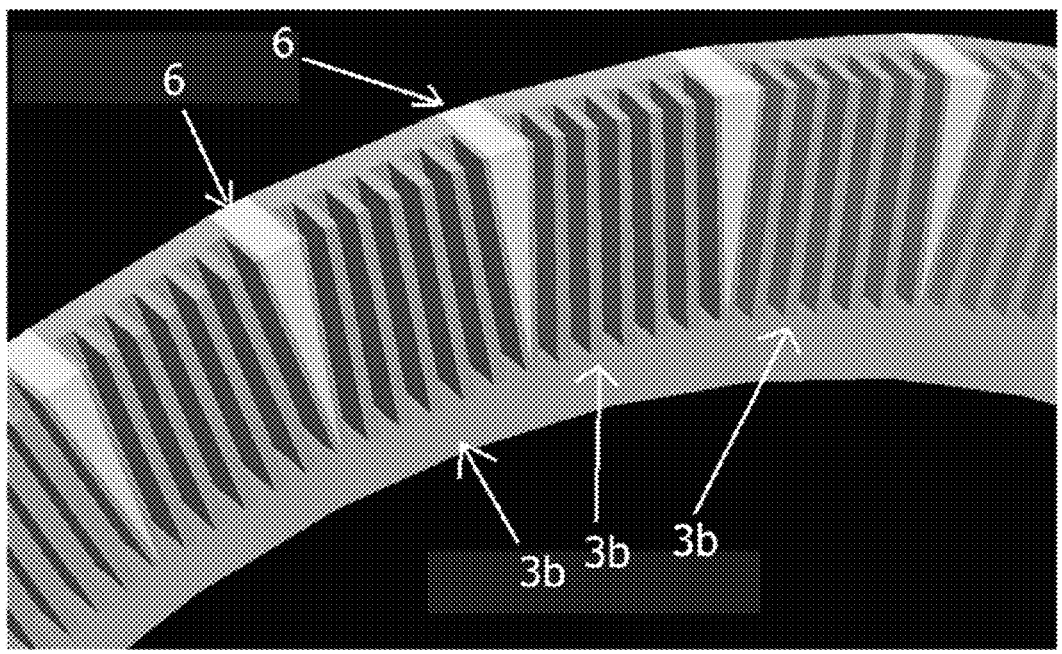
FIG. 9 shows adjacently arranged stator segments with filled V-gaps.

Depending on the chosen winding configuration these V-Gaps 6, cf. FIG. 8, are decreasing the flux density in the air gap. In such a case the Gap 6 should be filled up, cf. FIG. 9, with some iron material 7 to close the magnetic circuit. The filling material 7 may be of a sinter metal type with high permeability.

Studies have shown that filing in the triangle gives up to 20% more power output.

The reduction in force density using the polygonal form of the machine is significant. This is due to the following:
1. The introduction of gaps 6 in the backing iron disrupting the normal flux pattern,
2. The distortion of the slot pitch (distance from slot to slot) giving rise to uneven phase sequence in the machine which gets worse at the outer radius.

Item 2 is inherent in using parallel slot/parallel tooth segments 3 for an axial flux machine, and can only be mitigated by using the smallest radial length possible. However, item 1 may be reduced if the segments 3 are manufactured from laminations of the length commensurate with the outer radius, and then given the appropriate taper 8b on the sides after assembly into a segment 3, possibly by the use of water-abrasive jet. This will allow the segments 3 to be packed together as a series of segments without undue gaps 6 in the backing iron, cf. FIG. 1.

It is clear that the disruption of the normal backing iron flux pattern by introducing an inter-segment 3 gap is responsible for the majority of the loss of performance of the polygonal version of this machine.

In all these models, no account has been taken for stator lamination material that will be needed to support the stator within the structure. Because of the very high flux loading of the material, it will not be possible to use the usual expediency of drilling holes in the backing iron for mounting purposes, as this will reduce the performance of the machine. Instead, additional material will be needed behind the existing backing iron, with appropriate shapes for support purposes. This may take the form of dovetails to allow the laminations to be wedged into a support structure, or a series of tabs with holes in, that may be selectively removed to provide support along the radial direction with the through bars engaging on sleeves in the support structure. Alternatively, the backing iron depth may be increased in depth by the diameter of any holes drilled: but this method does not provide support in the middle of the stack without additional internal structures.

The lamination stacks with a dovetail on the back for connection purposes may in order to avoid leakage flux have an air gap between the support structure and corresponding dovetail, the air gap can be filled with non magnetic material, plastic, stainless steel etc. to limit leakage flux.

The space of the V-Gap 6 can also be used to bring some cooling liquid close to the stator.

In case there need to be an air gap bearing to control the air gap, the V-Gap 6 could be used to put some superconductor inside. In case the superconductor becomes superconducting, the Meisner Effect will occur in between the magnets and the superconductor and act as an air gap bearing. Because of the alternating magnetising direction of the magnets, there might be some losses in the superconductor that have to be taken out. The size of the V-Gap probably needs to be increased to have enough space for the superconductor including thermal insulation.

The concept of the polygon axial flux machine is not limited the types of machines described else where in this application. It would also be advantageous to apply the polygon concept to a traditional Permanent Magnet (PM) axial flux electrical machine.

Direct Drive (Gear less) wind drive train for which the before mentioned polygon generator design is suitable for, is often designed in an axial flux or radial flux type of machine.
6. The electrical machine or generator that will be described in the following will all be possible to make in a polygon form if it is a design with axial flux. On the other hand it is also possible to make them in a radial flux design, thus without the polygon design.

In the following three different concepts of electrical generators for a wind turbine generator will be presented, common for all of them is that they have a rotor that does not consist of permanent magnetic material and it does not have any rotor windings, as known from synchronous or induction generator. The magnetic flux in the machines is produced from various sources in the stator.

The rotor of the three different machines can be made with a combination of magnetic material and none-magnetic material in order to generate reluctance in the magnetic field. Alternatively, the rotor may be a metal disc (may be magnetic material) with protruding magnetic material. None of them have permanent magnetic materials in the rotor.

Although they are all mainly shown in an axial flux type embodiment many of the advantages would also apply to a radial flux type machine, and thus many aspects of the application should not be limited to an axial flux electrical generator.

Focus will be on PM less type generators which can be employed in wind generators having diameters larger than 5 m and less than 30 m, but not limited to that range.

Dash Electrical Generator

Dash proposed an inductor type generator which can be adopted as a generator in wind turbine generators.

Figure 10:
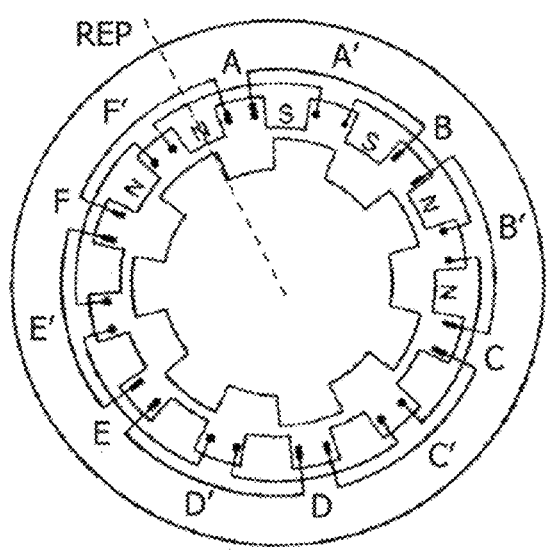
FIG. 10 shows a Dash type Inductor alternator (prior art)

The schematic diagram of Dash concept is shown in FIG. 10. This is a radial flux cylindrical type machine.

The stator consists of symmetrical slots 2 in which phase and field windings are placed as shown in FIG. 10. Field windings are labeled as A', B', C', D', E', F' & phase windings are labeled as A, B, C, D, E, F.

The rotor consists of several teeth made of ferromagnetic material. When the rotor revolves in the magnetic field set up by the field winding, the magnetic field is modulated and voltage is induced in the stator.

The main advantages of Dash type generators are:
1. Simple rotor structure that enables to go for very large diameter generators.
2. Stator can be segmented in to many parts that help to realize a modular type generator concept.
3. Stator can be 360 mechanical degrees and it can be an arc shaped having N mechanical degrees
4. Faulty segments can be disabled easily by switching off the corresponding field winding or the faulty segments 3 can be removed physically while the generator is in operation
5. Highly suitable for off-shore/on-shore as maintenance free type
6. This machine can be configured as axial or radial flux machine
7. The machine can be designed with multiple air gap or multi-stack features for adding power output levels.
8. It is highly suitable for concentrated phase winding 23a, 23b, 23c type machine.

Teeth Combination of Stator/Rotor:

Prior art has demonstrated working principle using 12 stator teeth and 7 rotor teeth. However, the inventors optimization work shows that generators with 12 stator teeth and 5 rotor teeth develop approximately 36% higher force density compared to the prior art 12/7 combination.

Figure 11:
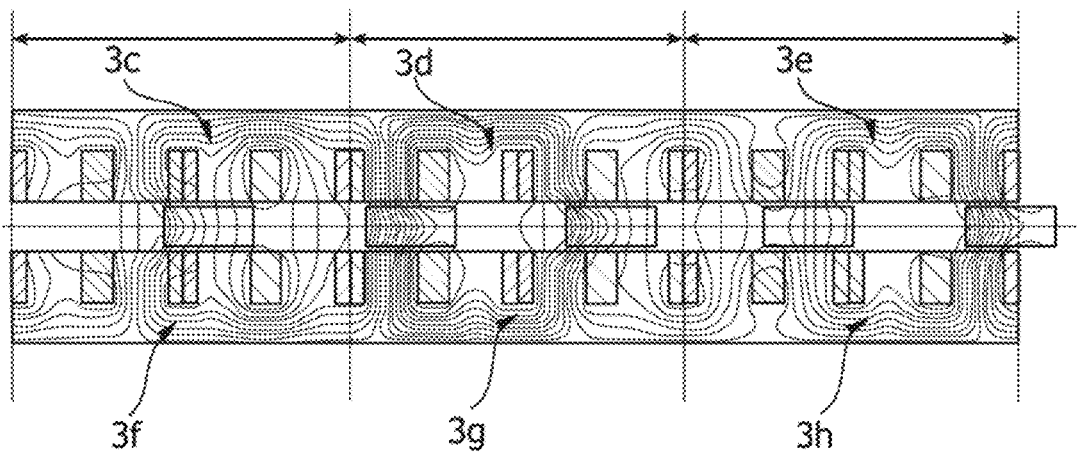
FIG. 11 shows a double stator/single rotor Axial flux Dash type generator.
Figure 12:
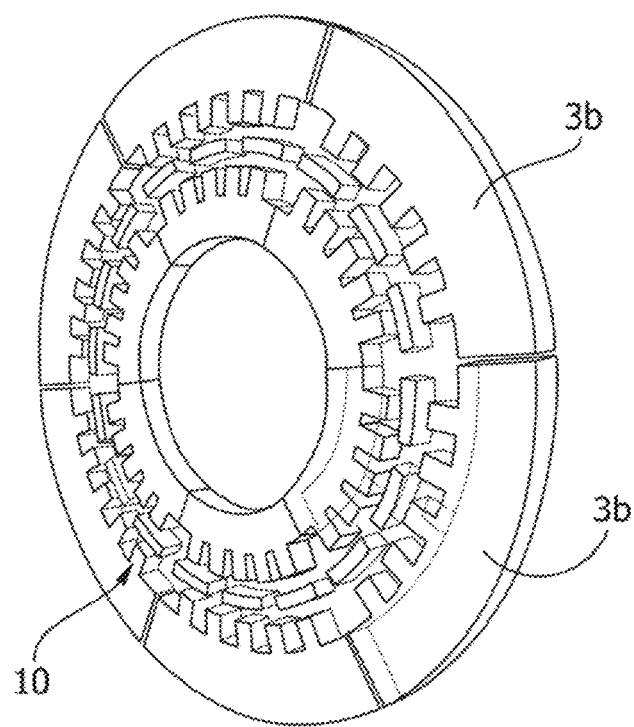
FIG. 12 shows a double stator/single rotor radial flux configuration.

A typical double stator/single rotor axial flux Dash type generator is shown in FIG. 11, whereas FIG. 12 shows a radial flux double stator/single stator configuration. The generator in FIG. 11 includes 6 different stator segments 3c-3h. The generator in FIG. 12 includes stator segments 3 and rotor blocks 10.

Figure 13:
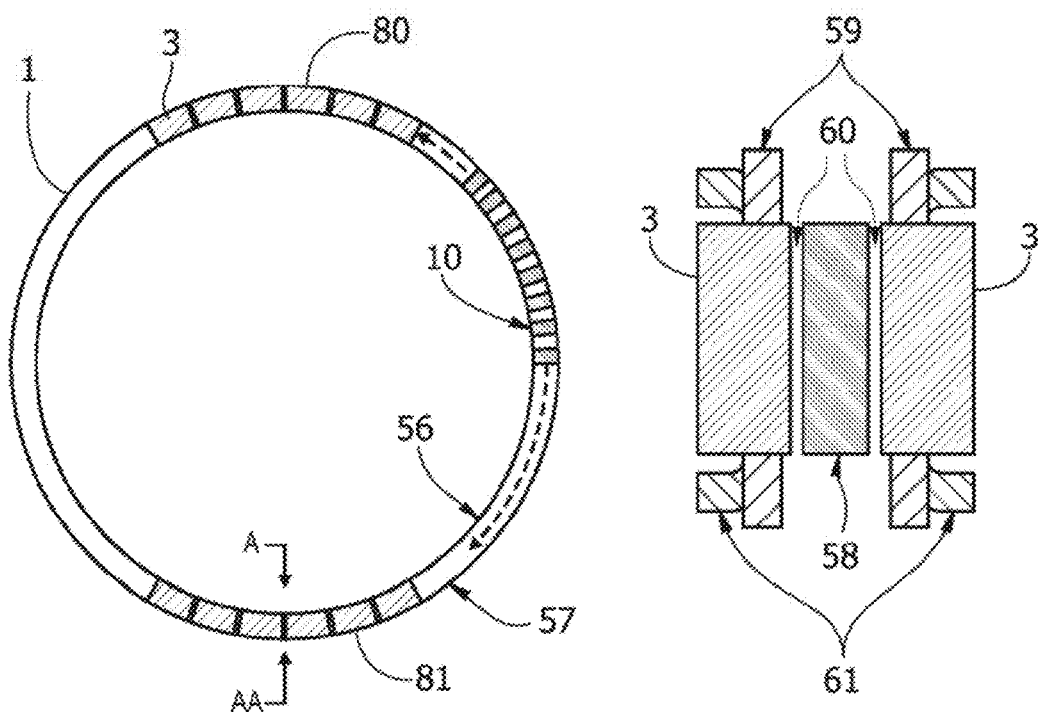
FIG. 13 shows an Arc-shaped machine.

A typical arc-shaped generator is shown in FIG. 13. The advantages of this arc type machine is that the stator may not have to circumference the rotor all 360 degrees, meaning that one rotor diameter can fit to several power ranges, depending on the number stator segments 3 attached. The stator segments 3 can be located in one group or in two or more groups, preferable with one group of stator segments 3 in the bottom and one in the top of the generator. As shown in FIG. 13, the generator has stator segments 3 and rotor blocks 10 located between an inner radius 56 and an outer radius 57. 12 stator segments 3 are located at a first side 80 of the generator, and 12 stator segments 3 are located at a second side 81 of the generator. The section of the generator in FIG. 13 includes a rotor 58 between two stator segments 3, with airgaps 60 therebetween. Phase end windings 59 and field end windings 61 are adjacent to the stator segments 3.

Lorentz Electrical Generator

For large diameters (>5 m) the Lorenz generator can be used. The rotor consists of blocks of ferromagnetic steel followed by none magnetic blocks whereas the stator consists of windings inserted slots 2 and permanent magnets on the stator for excitation.

The permanent magnet may be replaced by dc current windings that can be placed in the slots 2.

This machine may be configured in axial or radial flux configuration.
a) Axial Flux:
 1. Double sided stator/single rotor
 2. Single stator/double rotor
b) Radial flux:
 1. Double sided stator/single rotor
 2. Single stator/double rotor The Lorenz machine can be realized with
 1. Full laminated stator (360 deg) or sector of n deg
 2. N number of segmented stator for 360 deg or n deg Axial Flux Double Stator-Double Rotor Arrangement:

To the above concept, magnetic bearing effect can also be incorporated if the magnetic set up by stator 1 and stator 2 linked with rotor 1 and rotor 2 respectively.

Figure 14:
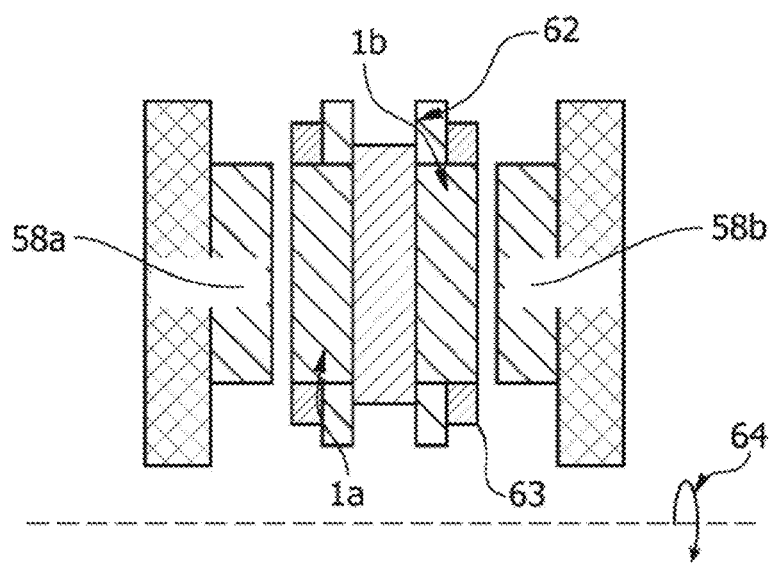
FIG. 14 shows a double stator/double rotor arrangement in an axial configuration.
Figure 15:
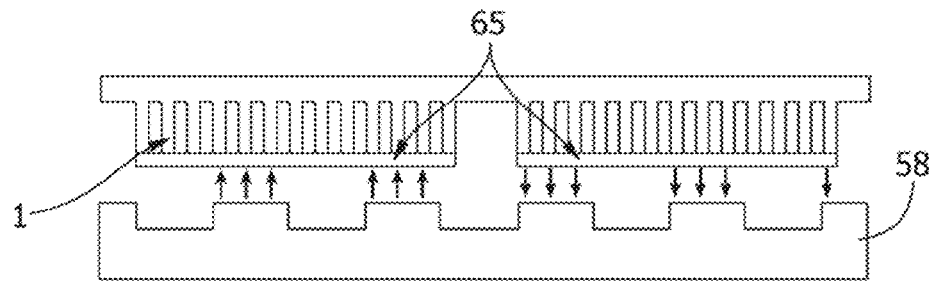
FIG. 15 shows a single stator/single rotor Lorenz machine with permanent magnet excitation.
Figure 16:
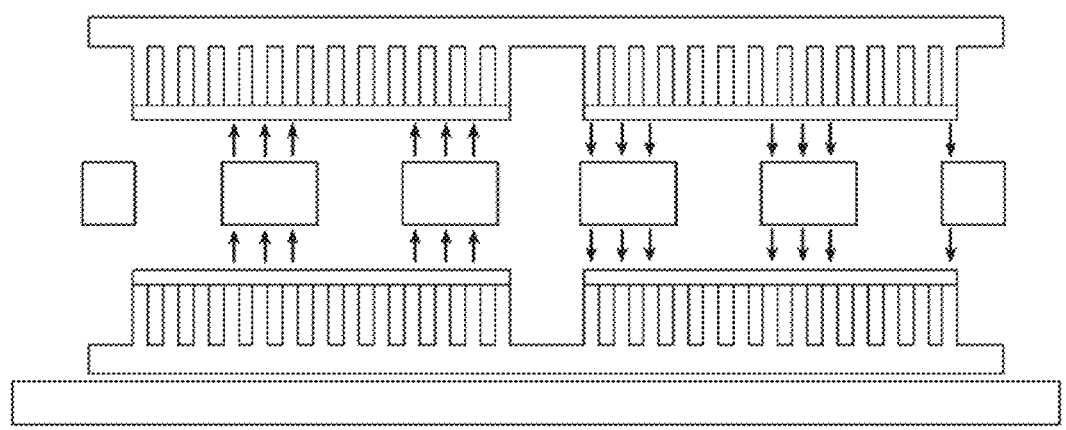
FIG. 16 shows a double stator/single rotor configuration with permanent magnet excitation.
Figure 17:
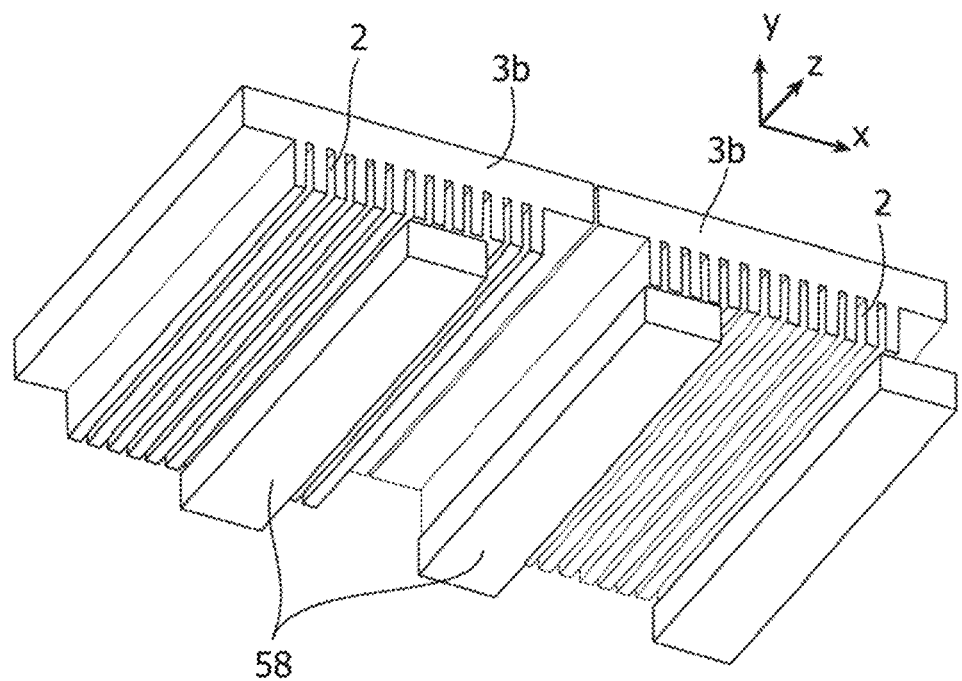
FIG. 17 shows a double stator/single rotor with DC current excited coils in the stator.
Figure 18:
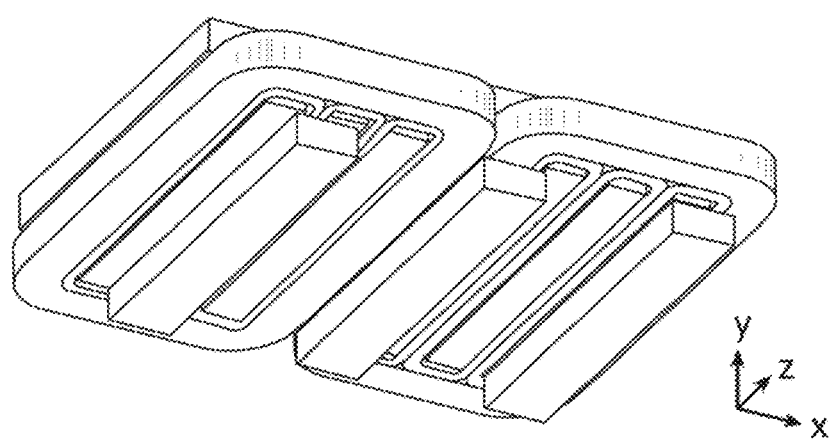
FIG. 18 shows a concentrated phase and field winding.

Possible stator/rotor configurations are shown in the following figures, where FIG. 14 shows a double stator/double rotor arrangement in an axial configuration, FIG. 15 shows single stator/single rotor Lorentz machine with permanent magnet excitation, FIG. 16 shows a double stator/single rotor configuration with permanent magnet excitation, FIG. 17 shows two adjacent stator segment 3b/single rotor with DC current excitation and FIG. 18 shows a concentrated phase and field winding. The stator/rotor configuration in FIG. 14 includes a first rotor 58a, a second rotor 58b, and two stators 1a, 1b therebetween, all of which rotate around an axis of rotation 64. DC field windings 62 and phase windings 63 are adjacent to the stators 1a,1b. FIG. 15 includes magnets 65, a stator 1, and a ferromagnetic rotor 58. FIG. 17 includes two adjacent stator segments 3b having slots 2 for DC field winding and/or AC winding.

Hybrid Synchronous Machine (HSM)

The "HSM" machine differs from the "DASH" machine primarily by having permanent magnets with alternating magnetic poles on the stator surface.

Figure 19:
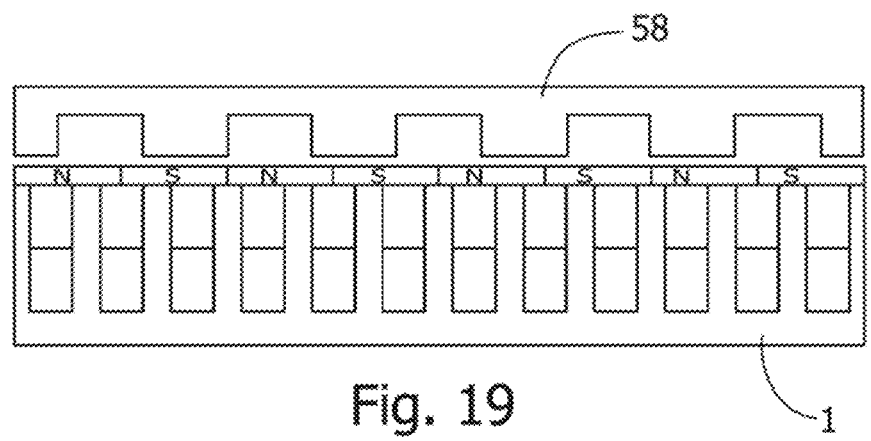
FIG. 19 shows a Linear Hybrid Synchronous Motor.

The basic hybrid synchronous machine topology is shown in FIG. 19. The machine consists of stator with winding and a salient pole reluctance rotor. Permanent magnets are placed on the stator teeth as shown in the FIG. 19. The PM sets up a magnetic field and links with stator winding and the magnetic reluctance rotor.

In generator mode, the magnetic flux linkage with the winding varies when reluctance rotors moves and hence the voltage gets induced.

The developed torque is expressed as;

$$T = gP\omega s = 3 \cdot gpVE \cdot \sin \cdot \delta 2 \cdot \pi \cdot fX$$

Figure 20:
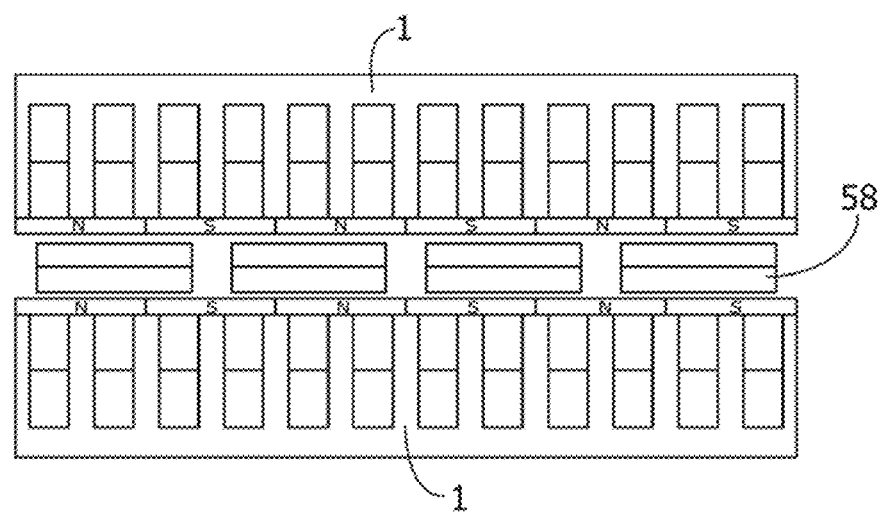
FIG. 20 shows a double-sided stator of a Linear Hybrid Synchronous Motor.
Figure 21:
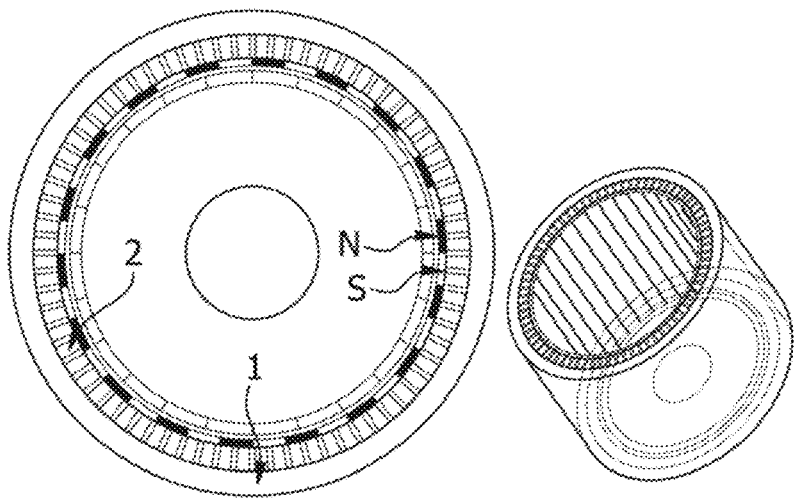
FIG. 21 shows a cylindrical radial flux Hybrid Synchronous Motor.
Figure 22:
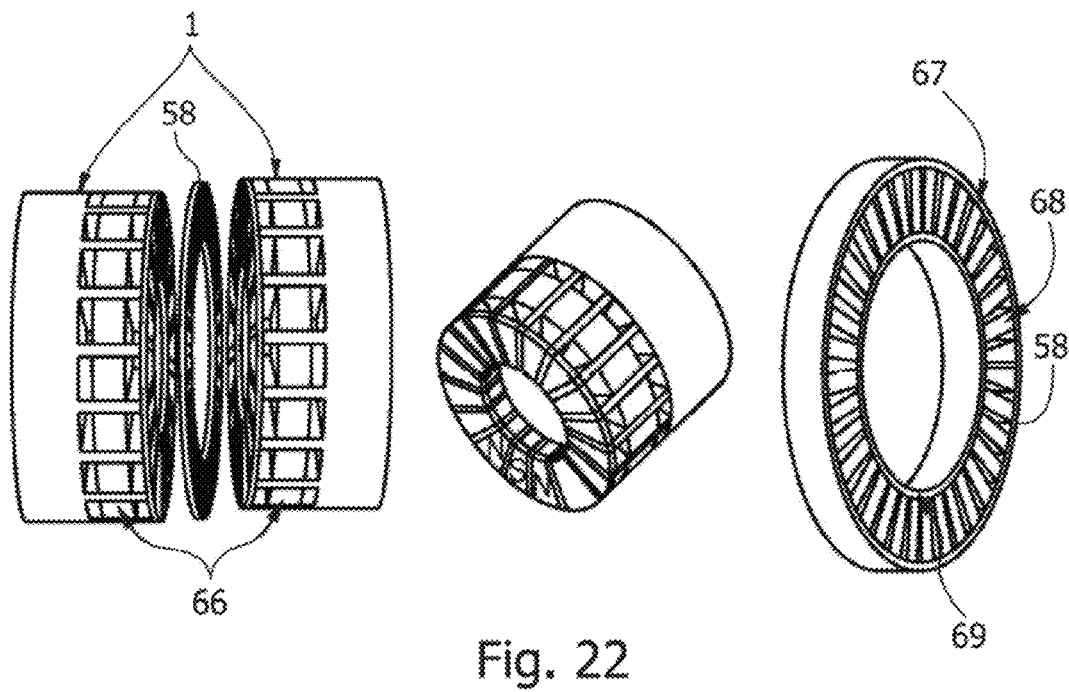
FIG. 22 shows a double sided axial flux Hybrid Synchronous generator, FIG. 23, Single layer multi level phase winding and gramme ring winding for DC excitation.
Figure 23:
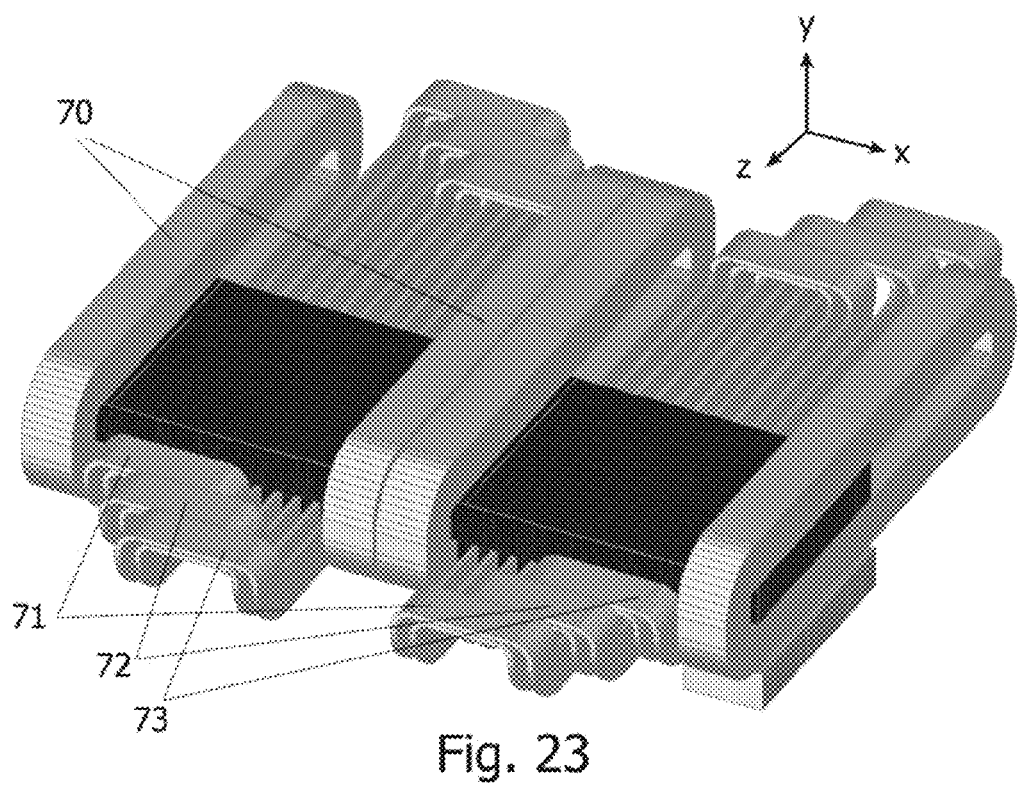

Where, V=Terminal Voltage
E=Induced Voltage
f=frequency of voltage
X=reactance of the stator winding
g=gear ratio=rotor speed/primary travelling field speed
p=number of rotor segments/winding pole pair Variants of HSM are shown in FIGS. 20-26. A double stator hybrid synchronous machine topology is shown in FIG. 20. FIG. 21 shows a three-dimensional view of a single stator HSM, whereas FIG. 22 shows a three-dimensional view of a double stator HSM. FIG. 22 includes a rotor 58 between two stators 1 having winding 66, a non-magnetic supporting outer ring 67, a ferromagnetic inner ring 69, and a rotor black ferromagnetic material 68 therebetween. FIG. 23 shows an illustration of the positioning of the three phase windings red (R), yellow (Y) and blue (B). FIG. 23 includes field coils 70, red phase coils 71, yellow phase coils 72, and blue phase coils 73. FIG. 24 shows the positioning of the phase windings (R) 74, (Y) 75 and (B) 76 in the stator, and their relative positions to the field windings 77 and the rotor blocks 10. FIG. 25 illustrates various types of stator layouts, whereas FIG. 26 illustrates field windings 77 and phase windings 63 in a two E-core stator arrangements.

The HSM can be used as generator for diameters >5 m. When the diameter of the machine is >5 m the stator can be segmented. The generator can be a segmented radial or axial flux type generator. The number of segments can be selected based on the weight and power consideration.

A typical generator with double layer winding stator 1 is shown in FIG. 27. The air gap between the magnets 65 and the stator teeth 24 is zero.

A small air gap between the magnets 65 and gap (<1 mm) between the stator teeth 24 and the magnets 65 (<0.5 mm) do not change the power significantly. A typical arrangement of the stator 1 and the rotor blocks 10 is shown in FIG. 28.

Figure 29:
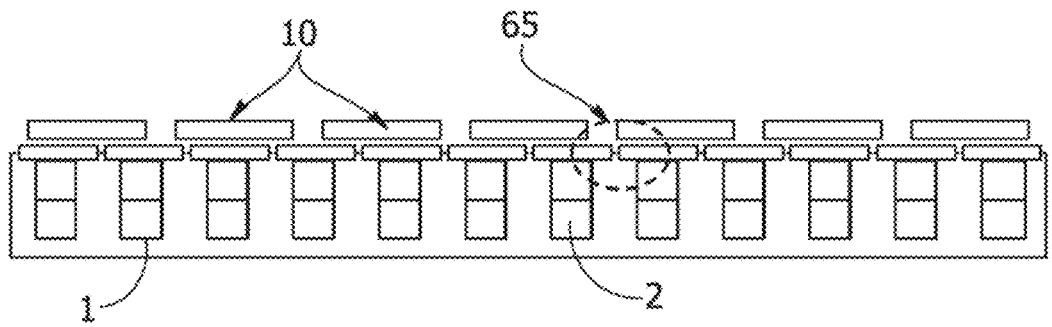
FIG. 29 shows a hybrid synchronous machine with magnets embedded in the slots 2.

Magnets 65 can be embedded inside slots 2 as shown in the FIG. 29. This helps retaining the magnets 65 on the stator teeth 24. This arrangement does not increase the magnet 65 leakage flux and does not significantly decrease the power level.

Figure 30:
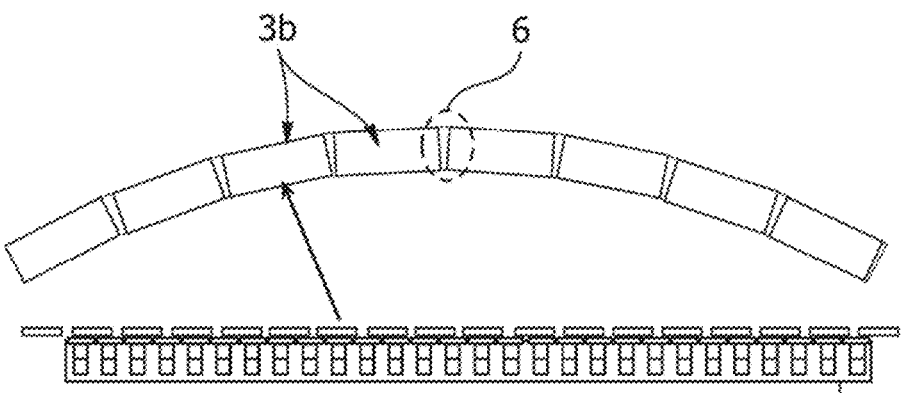
FIG. 30 shows a polygon-shaped hybrid synchronous machine.

A HSM can be configured and shaped, cf. FIG. 30, as a polygonal stator with stator winding having double layer stator.

A torque ripple reduction techniques in a segmented stator with HSM used in wind turbine application has been analyzed.

The V-gaps 6 between adjacent stator segments 3b result in entry and exit magnetic field effects and its associated problems such as force ripples, a technique is proposed for reducing torque ripple to 50%. This includes:

Step 1: Adjust the gap between the stator segments 3 in terms of number of rotor segments
Step 2: Reverse the phase currents with respect to adjacent segment 3b phase currents.

Figure 31:
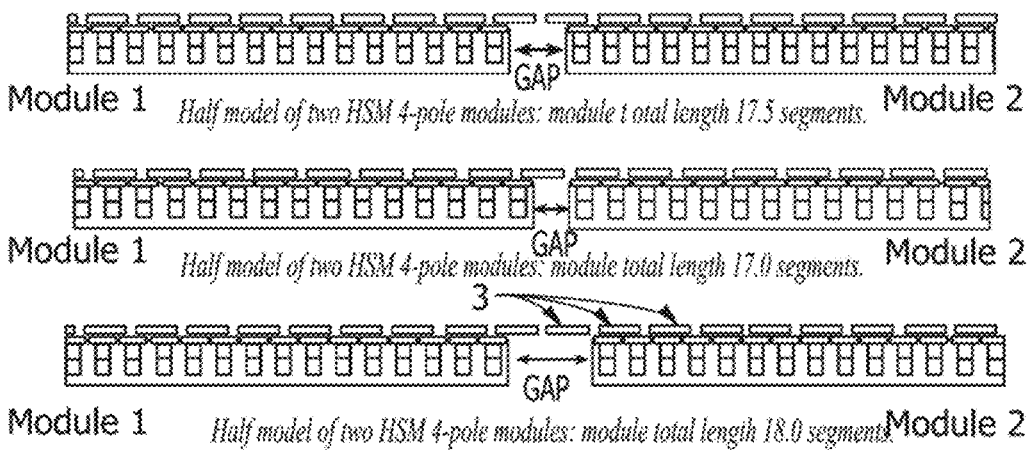
FIG. 31 shows torque ripple reduction, FIG. 32 illustrate force ripples for various cases.
Figure 32:
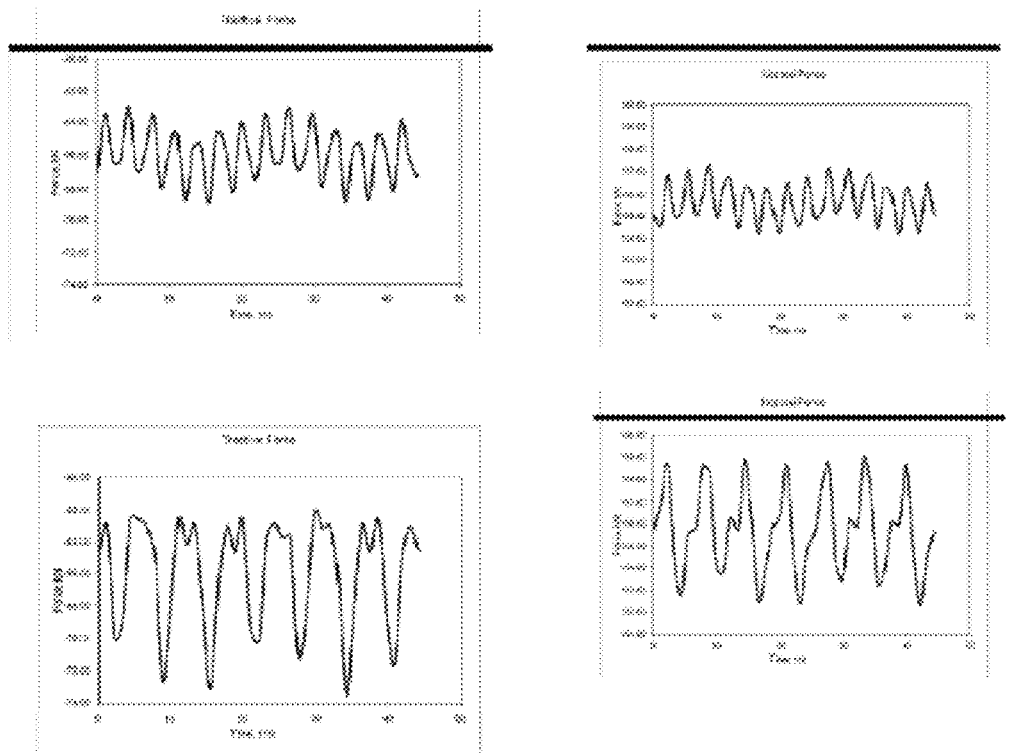

Typical arrangement for 3 cases is shown in FIG. 31 and the resulting force ripples curves are shown in FIG. 32.

Ripples in tractive and normal force in polygon shaped HSM can be reduced by suitable spacing of the adjacent stator segments 3b with respect to the number rotor segments that cover the entire stator length and by reversing the phase of currents of adjacent segment 3b with respect to the other segment 3.

Air gap control may apply to all types of machines mentioned here. Control of magnetic bearing may be very simple without additional sensors—for example by comparing the voltage induced in the stator coils on each side. Based on the result of such a comparison it is clear on which side the air gap needs to be adjusted.

Direct Drive machines of MW rating require very narrow air gap (of the order of a few mm, less than 10 mm) and large diameter (>5 m & <30 m) in order to reduce active mass.

Maintaining very narrow air gaps in such large diameter machines are a challenging mechanical design problem. Hence, these kinds of machines require local air gap control.

Local air gap control can be realized by means of mechanical contact bearing or fluid bearings or contactless magnetic bearing.

A separate 5 axis magnetic bearings can be added along with generator. This idea increases weight of the generator system.

Figure 33:
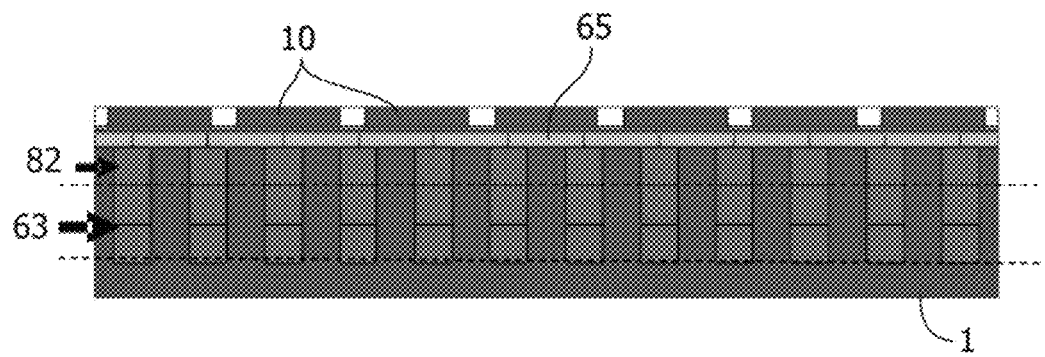
FIG. 33 shows a segment of a machine with DC winding inserted in the slots 2, can be used for magnetic bearing operation.

According to the present invention additional windings 82 may be incorporated in the stator (single side of double sided machine) in addition to phase windings 63, as shown in FIG. 33. The air gap between the stator 1 and the rotor blocks 10 can be maintained by changing dc current by sensing the rotor position.

Figure 34:
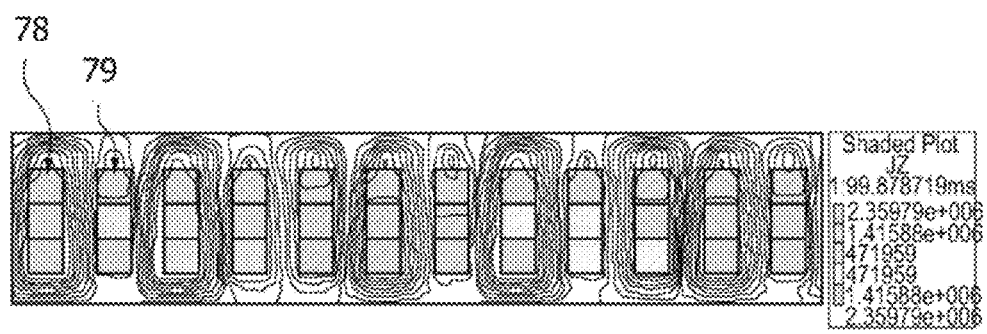
FIG. 34, shows a segment of a machine with DC winding where the DC current direction in the air gap control winding for a given excentric rotor position

An additional winding 82 in the stator slot 2 with dc excitation can produce bearing action in order to control the air gap. The performance of the machine and the weight of the machine is not affected significantly by the additional winding 82. Nor is the performance of the machine in terms of power factor and losses affected. FIG. 34, shows a segment of a machine with DC winding with DC Current in at 78 and DC Current out at 79.

An embodiment of the present invention relates to the electrical phase windings of the stator. All embodiments have a stator consisting of segments that are put together to form the stator as shown in FIG. 4 or FIG. 5. This may relate to an axial flux machine where the magnetic flux is parallel to the rotating shaft of the machine or to a radial flux machine where the flux is perpendicular to the rotating shaft of the machine.

In some embodiment the stator is 360 degrees (FIG. 4), in other embodiments the stator is limited one or more areas of for example 60 degrees (FIG. 5). Common for most embodiments is that the stator consists of segments.

Each stator segment 3 may comprise a dovetail shaped attaching arrangement for securing each stator segment 3 to a frame structure. The dovetail shape may be positioned on the back side of the segment. A non-magnetic material may be positioned between the dovetail shaped attaching arrangements and the frame structure in order to reduce leakage flux between stator segments and the frame structure. The non-magnetic material may comprise a stainless steel cover positioned between the dovetail shaped attaching arrangements and the frame structure.

V-shaped gaps 6 may exist between neighbouring stator segments 3 when these are aligned in the polygon structure 5. A ferromagnetic material may be position in the V-shaped gaps 6 between neighbouring stator segments thereby enhancing the efficiency of the power generator. Moreover, suitable stator cooling means may be positioned within the V-shaped gaps.

Each stator segment 3 may comprise steel laminates 4, said steel laminates 4 being arranged in a tangential direction 9 to the circumferential direction of the stator.

Each stator segment 3 is preferably made of a lamination stack of thin sheet metal. Each sheet forms a 2 dimensional picture of a stator segment, the third dimension is formed by the stacking. The sheets are formed so that there are slots 2 for receiving a number of stator winding, one can also say that the slots 2 form a number of stator teeth 24. The stator segment 3 then has a first side 14 formed by the first piece of lamination sheet, and a second side formed by last piece of lamination sheet. The other four sides comprise the main sides of the lamination sheet and is thus: a front side (facing the air gap), a rear side opposite of the air gap, see FIG. 3 and the remaining two sides that will be adjacent to the adjacent segment 3*b*.

All electrical three phase system, but also electrical systems of higher number of phases, can be connected in various ways. The two most common systems for a three phase setup are the Delta coupling and the Wye coupling. An electrical machine coupled in a Wye need to have one end of each of the three phase windings of the machine connected to a common point.

A segment 3 for an electrical machine according to any of the embodiments, should either by connected in Delta, Wye or with open windings. In case of open windings, the windings can connected at a common bus connector or alternatively can a groups of segments be connected into serial segments, wherein for the serial segments, each of the plurality of windings is connected in series with its corresponding winding in the adjacent segment 3*b*, and wherein the plurality of ending points is connected at a common point, the star point. The corresponding winding in the adjacent segment 3*b* is normally the winding which has a phase voltage that is in phase with the phase voltage of the segment. There may be situations where they are not in complete phase with each other.

In radial a flux machine the stator lamination is stacked in the axial direction and the axial flux machine is stacked in the tangential direction, see FIG. 1 and FIG. 2.

In the embodiments of the axial flux machine, each segment 3 is acting like a single linear machine, magnetic decupled from the other segments through a gap. The segments should be as close as possible to each other so that the distance/gap between adjacent segments 3*b* is low. This is, because all magnets in front of such a distance/gap do not create any torque, hence they are useless. The stator lamination stack of a radial flux machine can be made so there is virtually no gap between the segments. For the axial flux the amount of these useless magnets can be reduced, if the distance/gap between is reduced as well.

The winding 20*a*, 20*b*, 20*c*, 21*a*, 21*b*, 21*c* can be made in a single layer configuration or a two layer configuration, or even with more layers.

Figure 35:
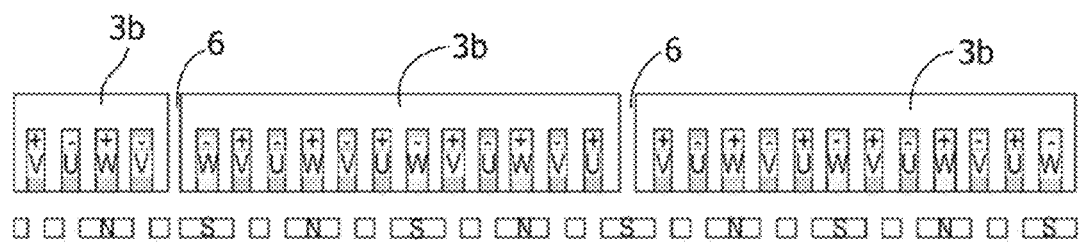
FIG. 35 shows a segment of a machine with single layer windings.
Figure 40:
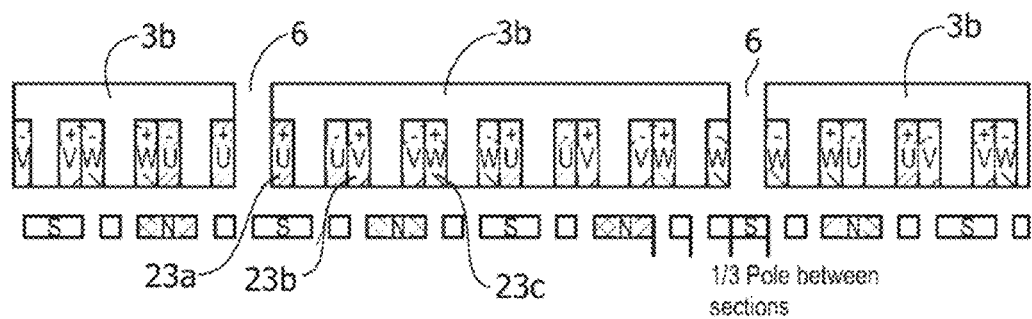
FIG. 40a shows a segments and part of adjacent segments of a machine with a concentrated windings single layer configuration.

The windings of a segmented machine can either be a concentrated winding 23*a*, 2*b*, 23*c*, as shown in FIG. 40 or a lap winding, as in FIG. 35.

The concentrated winding configuration is where each of the windings 23*a*, 23*b*, 23*c* is a concentrated wound winding around a single stator tooth 24, of the segment. In FIG. 40 the windings are in two layers, a similar configuration can also be made for a machine with single layer concentrated windings 23*a*, 23*b*, 23*c*, where only one phase winding will be in each slot.

Figure 36:
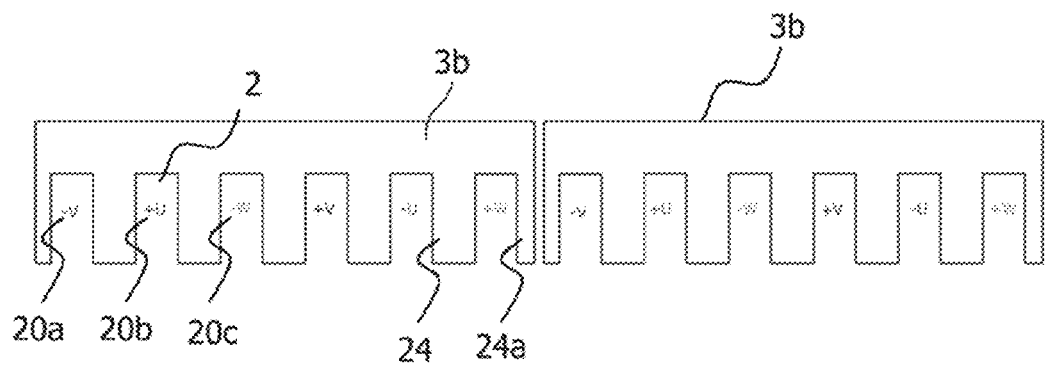
FIG. 36 shows two adjacent segments of a machine with single layer windings, and where the end tooth of each segment has the half width.

The lap winding configuration is as shown in FIG. 35. Each of the phase windings is wound with one or more turns that go around more than one stator tooth 24 and where the next phase winding is in the adjacent slot 2 with turns that goes around the same number of slots 2 as the earlier mentioned phase winding. The phase windings are leaping each other. The phase winding may consist of one or more sectors of the winding where each sector is a number of winding turns around the same slots 2. The next sector of the first phase winding is wound around a new group of slot 2 after the last phase winding. FIG. 36 shows two adjacent segments 3*b* where each segment 3 contains a three phase windings (v, u, w) 20*a*, 20*b*, 20*c* in a single layer, each segment 3 only have one winding sector. The plus and minus indicates the direction of the winding in the slot 2.

Figure 37:
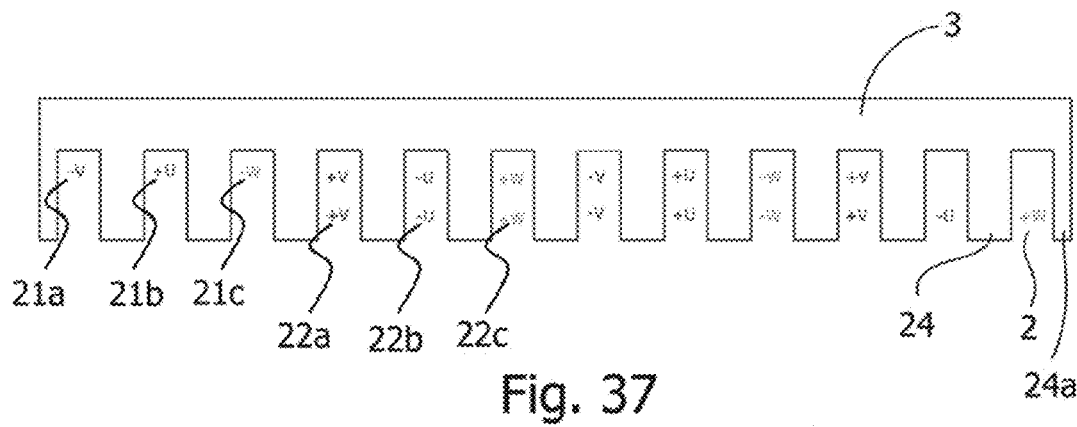
FIG. 37 shows a segment of a machine with a double layer windings configuration, with lap windings.

FIG. 35 shows more than two segments 3*b* where each phase winding 20*a*, 20*b*, 20*c* consist of two sectors in a single layer. FIG. 37 shows a segment 3 with a two layer lap winding, the winding in the left most slot 2 "−v" starts in the bottom layer 21*a* and goes around three stator tooth 24 and is in the fourth slot 2 as the "+v" winding in the upper layer 22*a*, the same applies to the "u" and "w" winding.

The winding may be embedded in the slots 2 in a single Layer Lap Winding 20*a*, 20*b*, 20*c* meaning that all teeth 24 are filled up with a one conductor. Between two segments there is a V-gap 6 in the size of ⅓ of a pole pitch at the medium diameter. The phases are distributed in the segments differently, so that all phases are present at the first slot 2 and last slot 2 of a segment 3 the same number of times.

In an embodiment of the present invention, an electrical machine comprising a plurality of stator segments, where each segment 3 has a plurality of electrical phase windings embedded in stator slots 2 in a phase sequence, and wherein the phase of the first slot 2 of a segment 3 is different from the phase of the first slot 2 of an adjacent segment 3*b*. Meaning that the sequence of the phases might be same, but the order of which they start in the first slot 2 differs.

The sequence of the phase windings in the electrical machine is so that the phase windings form a plurality of electrical phases distributed equally with the same phase angle between the electrical phases. For a three phase machine there should be angle of 120 electrical degrees between the phases.

The location of the individual phase in the segment 3 may affect the voltage level induced in the winding, therefore the voltage level of the three phases is not fully balanced. This may come from the fact that the length of at least one of windings 20, 21, 31 in a segment 3 differs from the length of the other windings in the same segment, which again might be related to the specific location of the winding in the slot 2 and the distance to the star point 39 and/or distance to terminal box or terminal bus bar, where the winding ends 40, 41 are connected in order to reach the electrical connection to the electrical grid or like where the machine is to be connected.

Changing the order of the phases for balancing the voltages of a larger part of the machine is a solution to overcome that problem, as an example three segments 3 can be connected in series, where each of the phase windings 20, 21, 31 in each segment 3 is connected in series with the phase winding of a corresponding electrical phase in the adjacent segment 3*b*.

For an electrical machine of the present invention the number of windings connected in series should equals the number of phase windings in each segment 3 times N, wherein N is an integer. This means that for a 3 phase machine the number of segment 3 should be 3, 6, 9 . . . etc.

In one embodiment of the invention an electrical machine is having two set of a plurality of phases, and where P segments form a first set of electrical phases and Q segments form a second set of electrical phases, the phases of the first set may not be aligned with the phases of the second set of electrical phases, wherein P and Q are an integer. In an example a machine is having 2×3 phases with a phase displacement of 30 electrical degrees.

In a single layer winding configuration, the windings can be put into the segments as shown in the FIG. 35 In this version a full end tooth 24*a* is used at the end of the segment. Here the whole slot 2 width is used as a distance between the segments 3. In one implementation is the yoke height increased a bit to avoid that a big amount of flux jumps from one segment 3 to the next.

The configuration of FIG. 36 is a configuration with single layer winding 20*a*, 20*b*, 20*c*, like in FIG. 35, but the where last stator tooth 24*a* is only of half the width, i.e. a half tooth. In this case it can be put into the segments as shown in FIG. 36. Here the segment 3 is ended with a half end tooth 24*a*. The distance between these segments need to be kept very small; to ensure that not too much of tooth width is lost. It might be necessary to increase the Yoke height a bit to avoid that a big amount of flux jumps from one segment 3 to the next.

An end tooth 24*a* at the end is necessary to take all the flux that can not go to the next segment. It can not be removed, without decreasing the power. Hence a quite large V-gap 6 of ⅓ of a poles pitch is necessary.

For a Double Layer Lap Winding as shown in FIG. 37 where the segments 3*b* are ended with a half end tooth 24*a*. The distance between these segments 3*b* need to be kept very small; to ensure that not too much of tooth width is lost.

At the end of each segment 3 the slots 2 are just filled up with one layer, this helps that the flux density goes down. Hence the Yoke height doesn't need to be increased.

Figure 39:
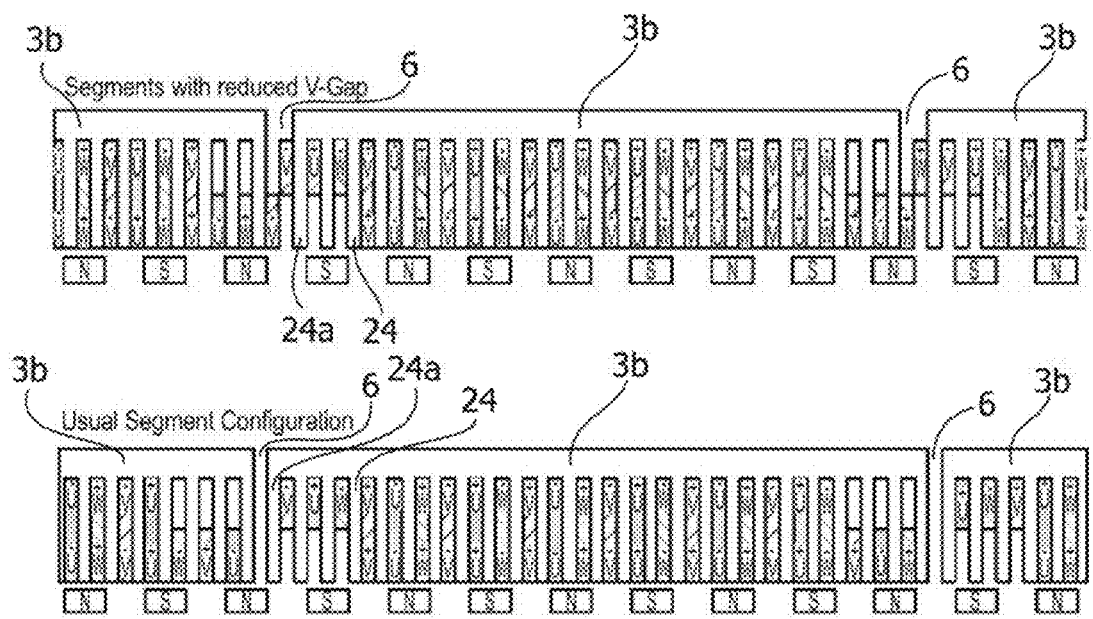
FIG. 39 top: shows a segment and part of adjacent segments of a machine with a double layer windings configuration, with lap windings, with the last winding around the end tooth.

In another embodiment a Full end tooth 24*a* is at segment 3*b* end, as in FIG. 35 or in the lower figure of FIG. 39.

The use of single or double layer can be mixed with all embodiments mentioned in this application.

A way to reduce the gap between to segments is to eliminate the last slot 2 and moving the two segments 3*b* closer together. By this the V-gap 6 size will be reduced. The two coils, which are now outside of the segment, can overlap, because it is a bottom layer and a top layer. In order to ensure that the top layer stays as a top layer, before assembly of the machine a non-magnetic spacer (not shown) can be inserted in the last stator slot 2 under the top layer, by doing so the winding maintain its position, and will not block for the bottom layer winding of the adjacent segment 3*b*.

The benefit of this invention is that the amount of magnets per Torque can be reduced. Also torque ripple will be reduced, because the teeth 24 for different segments do affect the poles differently for the same rotor position.

The lower figure of FIG. 39 shows segment 3 where the end teeth 24*a* at the end of the segments are just half filled up with a conductor with double layer lap windings. The upper figure of FIG. 39 also shows a segment 3 where the teeth at the end of the segments are just half filled up with a conductor with double layer lap windings, but without the last tooth 24*a*. This also applies to FIG. 38 showing two segments with a V-gap 6 in the size of ⅙ of a pole pitch at the medium diameter.

In an embodiment the segment 3 can have a higher number of slots 2, and thus the width also tend to be larger (covering a larger number of angular degrees by the segment), and by this the total segment 3 number is lower, in order to avoid having too many half filled slots 2.

Figure 38:
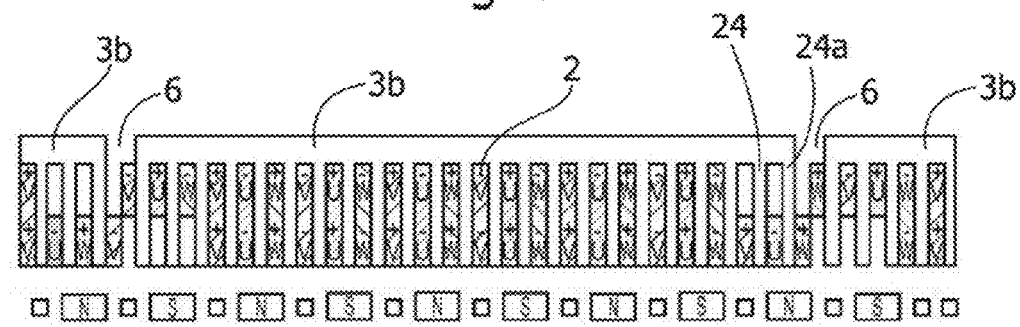
FIG. 38 shows a segment and part of adjacent segments of a machine with a double layer windings configuration, with lap windings, with the last winding around the end tooth.

In FIG. 38 is the V-Gap 6 between the segments is smaller, because the end tooth 24*a* is missing. Therefore many teeth 24 are only filled half. This reduces the power almost similar as for the single layer classical winding 21*a*, 21*b*, 21*c*. An advantage of this is the slightly simpler and shorter end winding compare to the single layer winding 20*a*, 20*b*, 20*c*.

Finally at the two ends the last three slots 2 are only half filled. Hence the created torque from this segment 3 is only half. The idea is to eliminate the last tooth 24*a*. By this, one coil (either the bottom layer or the top layer) is outside of the segment. Now the two segments 3*b* can be moved very close to each other. At the V-Gap 6*a* bottom layer will meet a top layer coil. Finally they will be one after another. Overlapping does not take place. A segmented axial flux machine, that has a two layer lap winding. Between the layers there is a V-Gap 6. The last three slots 2 are only filled half with copper.

A method to increase the so called Carter factor in a machine with concentrated winding 23*a*, 23*b*, 23*c* is by having a forked slot, meaning that an additional pole piece is introduced in between the two sets of windings in each slot 2 in FIG. 18.

The Carters Factor will be higher with such a forked slot. A higher Carters factor means that the flux density in the air gap is higher. Finally more torque can be produced.

In one configuration the phases of two segments, which are adjacent to each other, but located at different places, these can be connected in series together. This is possible if the distance in between two segments is e.g. ⅓ or ⅔ of a pole pitch instead of ⅗ of a pole pitch, other ratios may also apply. If the phases of three segments, that are next to each other are connected to each other in series, the terminal voltage, which is the sum of all the three different characteristics of the segment 3 voltages, is the same for all phases. Finally the Voltage is balanced in all the phases. This means three segments are put together and become an independent system, with a balance phases. The three segments cannot be operated independent to each other any more. Similar can be made for machine with higher number phase, such as multiple of 3, or any other combination.

Although the previous paragraph mentioned that the serial connection of segments should be with adjacent segments 3b, similar serial connection will also work between segments that are not adjacent to each other.

The three voltages of the three phases of a stator segment 3 do not have the same amplitude and harmonics. This is because each phase is located at a different location in the segment 3, than another phase. Thus the system is not symmetric for all the three phases.

The present invention also relates to a method of assembling an electrical machine with a plurality of adjacent stator segments 3, each segment 3 comprising a yoke with a plurality of stator slots 2, the method comprising the steps of: In a first segment, embedding a plurality of electrical phase windings in the stator slots 2 in a phase sequence; In an adjacent segment, embedding a plurality of electrical phase windings in the stator slots 2 in a phase sequence. The phase windings in the first segment 3 is to be connected in series with the phase winding of a corresponding electrical phase of the adjacent segment, so that the phase of the first slot 2 of a segment 3 is different from the phase of the first slot 2 of an adjacent segment.

When arranging the phase windings in the slots 2 of the stator 1 many issues have to be considered. One thing that is important is to make the most optimal use of the length of the winding 20. There is only induced voltage in the winding where ever the winding is exposed to a change in the magnetic field, this means voltage is induced in the slot, and that nearly no voltage is induced outside the slot, other than what comes from the leakage inductance. It is therefore important minimize the end winding and the winding used for connections as much as possible. This is especially an issue for a segmented stator configuration where each segment 3 should be independent of the other segments.

This embodiment deals only with a three phase lap winding 21, 22. It can be applied for a single layer or a double layer winding.

Figure 41:
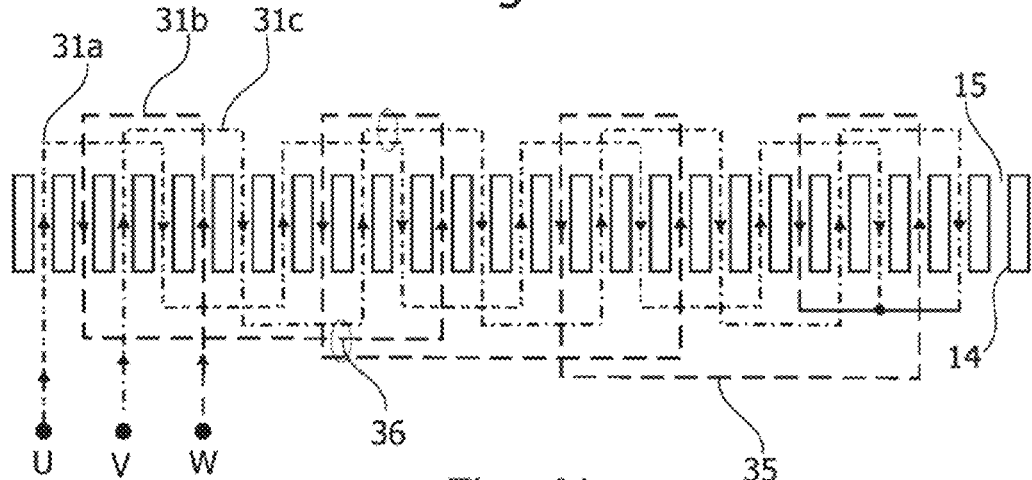
FIG. 41 shows the winding path of a segment of a machine, with large end winding waste and pluralities of triple winding overlaps.

FIG. 41 shows a winding configuration where phase W has a six pole pitch end winding for waste 35. Additional there are three locations 36 where there are three coils at the same end winding.

Figure 42:
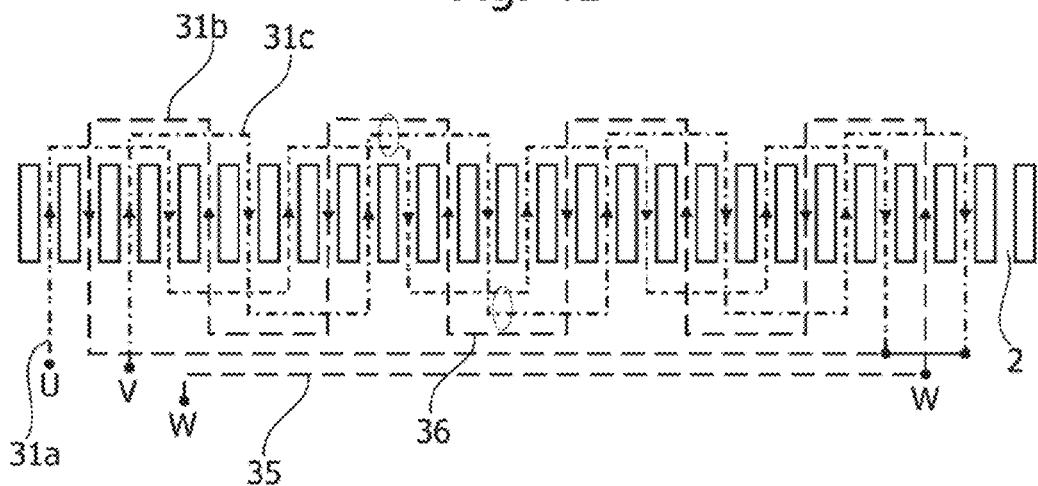
FIG. 42 shows the winding path of a segment of a machine, with large end winding waste and pluralities of triple winding overlaps.

FIG. 42 shows a winding configuration where phase W has a 12 pole pitch end winding for waste 35 and again there are three locations 36 where there are three coils at the same end winding.

FIG. 44 shows the simple way, where all the phases are put into the lamination from the same side. The third phase (the phase to the right) needs to have a fourth part 32 of the whole turn, to reach the connection to the next coil.

In one embodiment of the present invention, a stator segment 3 is having a set of windings 31, where some windings 31a, 31b start from one side of the stator segment 3 and other(s) 31c starts from the other side of the segment.

An embodiment describes a segment 3 with three phases, where the third phase 31c starts from the other side of the stator segments as the first two phases 31a, 31b, as shown in FIG. 43.

The third phase winding starting point 40 has to be extended along a rear side of the segment 3 (stator lamination) along to reach the other side where the two windings are having their starting points 40, if so is needed. The third phase output which is connected 37 with the other phases at the star point 39 or common point 39 needs again be put behind the stack of stator lamination to reach the other two phases.

FIG. 43 show an optimal winding configuration where the end winding waste is reduced to twice the iron core length, i.e. the length of a slot, this is mainly only optimal for a generator with a short stator stack, and the generator structure need to allow the winding to go behind the stator yoke at connection 37. The windings are located so at no end winding location are there more than two coils.

FIG. 41 to FIG. 43 shows a setup with just a single winding, the same principle would of course apply in winding configuration with two or more turns, and also for one or two layers.

FIG. 43 shows an embodiment of the new invention, where the phase winding goes straight from one to the next without additional turns, the third phase is put into the lamination from the other side. The third phase does not need to have a fourth part of the whole turn, to reach the connection to the next coil. Therefore the third phase needs to be put behind the stack along two times.

Figure 45:
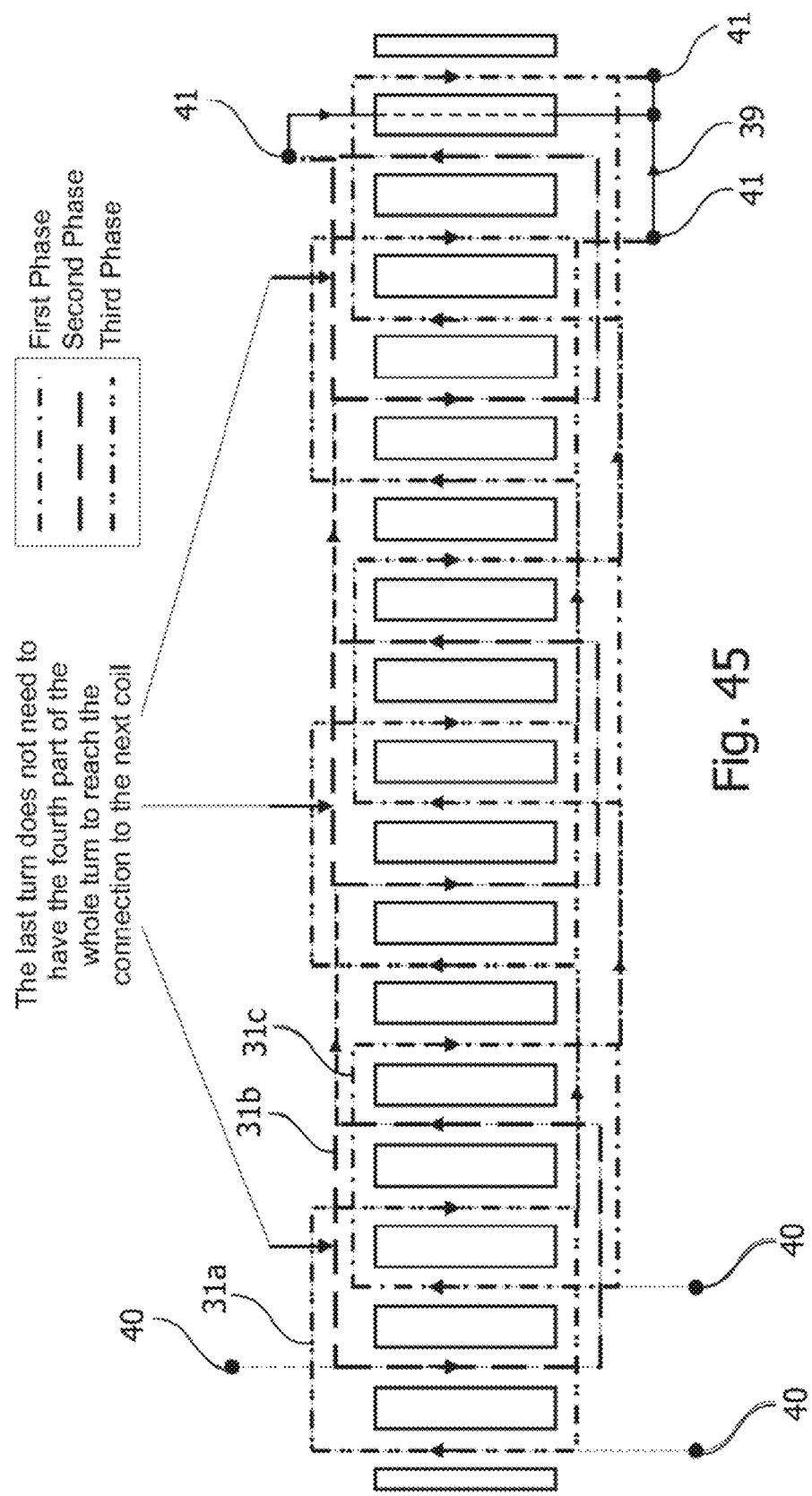
FIG. 45 shows the winding path with turns of a segment of a machine, with low end winding waste.

The advantages of the winding configuration shown in FIG. 45, is that the last turn that continues at the connection to the next coil, does not need to have the fourth part of a whole turn to reach the connection to part. This applies to all three phases, whereas the configuration in FIG. 44, do need to have the fourth part of a whole turn. In case of a low number of turns and a long segment 3 in the normal direction, but short lamination stack length, the advantage is bigger, because fraction of coil that is saved becomes even bigger. By reducing the length of the coil the copper losses are reduced proportionally.

FIG. 44 shows a common winding configuration where the advantage described above is not there. The third phase needs to have a fourth part 32 of the whole turn also at the last turn to reach the connection to the next coil.

This can by applied to all segmented machines, either radial flux, axial flux or linear.

An embodiment of the invention relates to a method for assembling a generator where some windings start from one side of the stator segment 3 and other(s) starts from the other side of the segment.

In a method of assembling a stator segment 3 for an electrical machine with a plurality of windings, where each winding having a winding starting and ending point, and a stator yoke with a plurality of stator slots 2 for receiving at least one stator winding, the segment 3 is having a first side 14 and a second side 15 as in FIG. 3 the method comprising the steps of:

Embedding at least one winding with its starting point 40 at the first side 14, and its ending point 41 at the first side 14 of the segment, in one or more stator slots 2, and Embedding at least one other winding having its starting point 40 at the second side 15, and its ending point 41 at the second side 15 of the segment, in one or more stator slots 2.

In a further embodiment the method of assembling a stator segment 3 also relates where the plurality of ending points are connecting at a common point, and where the at least one winding ending at the second side is/are extended to connect with the other ending points. The at least one winding ending at the second side 15 may extend along a rear side of the segment.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A stator segment for an electrical machine, comprising a plurality of windings, each winding having a winding starting and ending point, and a stator yoke with a plurality of stator slots for receiving at least one stator winding, said segment having a first side and a second side,
   at least one winding having its starting point at the first side, and its ending point at the first side of the segment, wherein the at least one winding is received in one or more stator slots, and
   at least one other winding having its starting point at the second side, and its ending point at the second side of the segment, wherein the at least one other winding is received in the one or more stator slots,
   wherein the plurality of windings is received in the one or more stator slots with two or more turns around the one or more stator slots, and wherein the plurality of windings comprise lap windings.

2. A stator segment for an electrical machine according to claim 1, wherein the plurality of ending points connecting at a common point, and where the at least one winding ending at the second side is extended to connect with the other ending points.

3. A stator segment for an electrical machine according to claim 2, wherein the at least one winding ending at the second side is extended along a rear side of the segment.

4. A stator segment for an electrical machine according to claim 1, wherein a number of plurality of windings is three.

5. A stator segment for an electrical machine according to claim 4, wherein two windings having their starting and ending point at the first side of the segment and one winding having its starting and ending point at the second side of the segment.

6. A stator segment according to claim 1, wherein the windings are embedded in the slots in a single layer.

7. A stator segment according to claim 1, wherein the windings are embedded in the slots in a double layer.

8. An electrical machine comprising:
   a plurality of stator segments, each stator segment comprising:
      a plurality of windings, each winding having a winding starting and ending point, and a stator yoke with a plurality of stator slots for receiving at least one stator winding, said segment having a first side and a second side,
      at least one winding having its starting point at the first side, and its ending point at the first side of the segment, wherein the at least one winding is received in one or more stator slots, and
      at least one other winding having its starting point at the second side, and its ending point at the second side of the segment, wherein the at least one other winding is received in one or more stator slots
   wherein the plurality of stator segments form a plurality of groups of segments, said groups of segments each comprising a set of serial segments and an end segment, wherein for the set of serial segments, each of the plurality of windings is connected in series with its corresponding winding in the adjacent segment and wherein the corresponding windings of the end segment is connected in series with the winding of the set of serial segments, wherein the plurality of ending points connecting at a common point, and where the at least one winding ending at the second side is extended to connect with the other ending points.

9. A method of assembling a stator segment for an electrical machine comprising a plurality of windings, each winding having a winding starting and ending point, and a stator yoke with a plurality of stator slots for receiving at least one stator winding, said segment having a first side and a second side, said method comprising:
   embedding at least one winding with its starting point at the first side, and its ending point at the first side of the segment, in one or more stator slots, and
   embedding at least one other winding having its starting point at the second side, and its ending point at the second side of the segment, in the one or more stator slots,
   wherein the plurality of windings is received in the one or more stator slots with two or more turns around the one or more stator slots, and wherein the plurality of windings comprise lap windings.

10. A method of assembling a stator segment according the claim 9, wherein the plurality of ending points connecting at a common point, and where the at least one winding ending at the second side is extended to connect with the other ending points.

11. A method of assembling a stator segment according the claim 10, wherein the at least one winding ending at the second side is extended along a rear side of the segment.

12. A method of assembling a stator segment according the claim 9, wherein the windings are embedded in the slots in a single layer.

13. A method of assembling a stator segment according the claim 9, wherein the windings are embedded in the slots in a double layer.

* * * * *